United States Patent
Le Saint et al.

(10) Patent No.: US 10,313,133 B2
(45) Date of Patent: Jun. 4, 2019

(54) SECURE COMMUNICATIONS PROVIDING FORWARD SECRECY

(71) Applicant: VISA INTERNATIONAL SERVICE ASSOCIATION, San Francisco, CA (US)

(72) Inventors: Eric Le Saint, Los Altos, CA (US); Payman Mohassel, Milpitas, CA (US)

(73) Assignee: Visa International Service Association, San Francisco, CA (US)

( * ) Notice: Subject to any disclaimer, the term of this patent is extended or adjusted under 35 U.S.C. 154(b) by 64 days.

(21) Appl. No.: 15/629,689

(22) Filed: Jun. 21, 2017

(65) Prior Publication Data
US 2018/0375663 A1     Dec. 27, 2018

(51) Int. Cl.
*H04L 29/06* (2006.01)
*H04L 9/32* (2006.01)
*H04L 9/30* (2006.01)

(52) U.S. Cl.
CPC .......... *H04L 9/3247* (2013.01); *H04L 9/3066* (2013.01); *H04L 63/0435* (2013.01); *H04L 63/0442* (2013.01); *H04L 63/061* (2013.01); *H04L 63/0823* (2013.01)

(58) Field of Classification Search
CPC combination set(s) only.
See application file for complete search history.

(56) References Cited

U.S. PATENT DOCUMENTS 6,446,207 B1 *   9/2002   Vanstone .............. H04L 9/3066
                                                                   380/30

* cited by examiner

*Primary Examiner* — Tri M Tran
(74) *Attorney, Agent, or Firm* — Kilpatrick Townsend & Stockton LLP

(57) ABSTRACT

Embodiments of the invention can establish secure communications using a single non-traceable request message from a first computer and a single non-traceable response message from a second computer. Non-traceability may be provided through the use of blinding factors. The request and response messages can also include signatures that provide for non-repudiation. In addition, the encryption of the request and response message is not based on the static keys pairs, which are used for validation of the signatures. As such, perfect forward secrecy is maintained.

18 Claims, 11 Drawing Sheets

| | | IFD (client) | ICC (server) |
|---|---|---|---|
| 901 | Store | $Q\_s\_\{n\}, C\_s\_\{n\}, SD\_c, ID\_s, C\_c,$ $d\_c, Q\_c = [d\_c] P, seed$ | $d\_s\_\{n\}, C\_s\_\{n\}, Q\_s\_\{n\} =$ $[d\_s\_\{n\}]P, SD\_s, d\_s\_\{n+1\},$ $C\_s\_\{n+1\}, Q\_s\_\{n+1\} = [d\_s\_\{n+1\}]P$ |
| 902 | Generate | $d\_bc = PRNG() \# [0..q-1]$ | |
| 903 | Determine | $Q\_bc = [d\_bc] . P$ | |
| 904 | Determine | $Z\_1 = [d\_bc] . Q\_s\_\{n\}$ | |
| 905 | Determine | $sID\_c = x\text{-coord}(Q\_bc)$ | |
| 906 | Determine | $sk\_1\_c = KDF(Z\_1, ID\_s, sID\_c)$ | |
| 907 | Determine | $sig\_c = sign(d\_c, seed \mid SD\_c \mid Q\_bc \mid Q\_s)$ | |
| 908 | Generate | $enc\_c = AEAD(sk\_1\_c, seed \mid SD\_c \mid C\_c \mid sig\_c \mid PAD\_c, Q\_bc)$ | |
| 909 | Zeroize | $Z\_1, sk\_1\_c$ | |
| 910 | Transmit | $Q\_bc, enc\_c$ | ----------------------> |
| 911 | Validate | | $Q\_bc$ |
| 912 | Determine | | $Z\_1 = [d\_s\_\{n\}] . Q\_bc$ |
| 913 | Determine | | $sID\_c = x\text{-coord}(Q\_bc)$ |
| 914 | Determine | | $sk\_1\_c = KDF(Z\_1, ID\_s, sID\_c)$ |
| 915 | Determine | | $seed \mid SD\_c \mid C\_c \mid sig\_c \mid PAD\_c =$ $AEAD\text{-}1(sk\_1\_c, enc\_c, Q\_bc)$ |
| 916 | Validate | | seed |
| 917 | Zeroize | | $sk\_1\_c, Z\_1$ |
| 918 | Determine | | $Q\_c = PubK(C\_c)$, |
| 919 | Validate | | $C\_c$ signature, $Q\_c$ |
| 920 | Validate | | $verify(Q\_c, sig\_c, seed \mid SD\_c \mid Q\_bc \mid Q\_s)$ |
| 921 | Generate | | $d\_bs = PRNG() \# [0..q-1]$ |
| 922 | Determine | | $Z = [d\_bs . d\_s\_\{n+1\}] Q\_bc$ |
| 923 | Determine | | $Q\_bs = [d\_bs] . Q\_s\_\{n+1\}$ |
| 924 | Determine | | $sID\_s = x\text{-coord}(Q\_bs)$ |
| 925 | Determine | | $sk\_s \mid sk\_c = KDF(Z, sID\_s, sID\_c)$ |
| 926 | Generate | | $Enc\_s = AEAD(sk\_s, d\_bs \mid C\_s\_\{n+1\} \mid SD\_s \mid PAD\_s, Q\_bs)$ |
| 927 | Zeroize | | $sk\_s, Z, d\_bs$ |
| 928 | Transmit | <---------------------- | $Q\_bs, enc\_s$ |
| 929 | Validate | $Q\_bs$ #belong EC domain | |
| 930 | Determine | $Z = [d\_bc] . Q\_bs$ | |
| 931 | Determine | $sID\_s = x\text{-coord}(Q\_bs)$ | |
| 932 | Determine | $sk\_s \mid sk\_c = KDF(Z, sID\_s, sID\_c)$ | |
| 933 | Zeroize | $Z, d\_bc$ | |
| 934 | Determine | $d\_bs \mid C\_s\_\{n+1\} \mid SD\_s \mid PAD\_s =$ $AEAD\text{-}1(sk\_s, enc\_s, Q\_bs)$ | |
| 935 | Determine | $Q\_s\_\{n+1\} = PubK(C\_s\_\{n+1\})$ | |
| 936 | Validate | $C\_s\_\{n+1\}$ signature, $Q\_s\_\{n+1\}$ | |
| 937 | Validate | $[d\_bs] . Q\_s\_\{n+1\} = Q\_bs$ | |
| 938 | Zeroize | $d\_bs$ | |

*FIG. 9*

| | | IFD (client) | ICC (server) |
|---|---|---|---|
| 1001 | Store | $Q\_s\_\{n\}, C\_s\_\{n\}, SD\_c, ID\_s, C\_c, d\_c, Q\_c = [d\_c]P, seed$ | $d\_s\_\{n\}, C\_s\_\{n\}, Q\_s\_\{n\} = [d\_s\_\{n\}]P, SD\_s, d\_s\_\{n+1\}, C\_s\_\{n+1\}, Q\_s\_\{n+1\} = [d\_s\_\{n+1\}]P$ |
| 1002 | Generate | $d\_bc = PRNG() \# [0..q-1]$ | |
| 1003 | Determine | $Q\_bc = [d\_bc] . P$ | |
| 1004 | Determine | $Z\_1 = [d\_bc] . Q\_s\_\{n\}$ | |
| 1005 | Determine | $sID\_c = x\text{-coord}(Q\_bc)$ | |
| 1006 | Determine | $sk\_1\_c = KDF(Z\_1, ID\_s, sID\_c)$ | |
| 1007 | Determine | $sig\_c = sign(d\_c, seed \mid SD\_c \mid Q\_bc \mid Q\_s)$ | |
| 1008 | Generate | $enc\_c = AEAD(sk\_1\_c, seed \mid SD\_c \mid C\_c \mid sig\_c \mid PAD\_c, Q\_bc)$ | |
| 1009 | Zeroize | $Z\_1, s\_1\_c$ | |
| 1010 | Transmit | $Q\_bc, enc\_c$ --------------------> | |
| 1011 | Validate | | $Q\_bc$ |
| 1012 | Determine | | $Z\_1 = [d\_s\_\{n\}] . Q\_bc$ |
| 1013 | Determine | | $sID\_c = x\text{-coord}(Q\_bc)$ |
| 1014 | Determine | | $sk\_1\_c = KDF(Z\_1, ID\_s, sID\_c)$ |
| 1015 | Determine | | $seed \mid SD\_c \mid C\_c \mid sig\_c \mid PAD\_c = AEAD\text{-}1(sk\_1\_c, enc\_c, Q\_bc)$ |
| 1016 | Validate | | seed |
| 1017 | Zeroize | | $sk\_1\_c, Z\_1$ |
| 1018 | Determine | | $Q\_c = PubK(C\_c)$ |
| 1019 | Validate | | $C\_c$ signature, $Q\_c$ |
| 1020 | Validate | | $verify(Q\_c, sig\_c, seed \mid SD\_c \mid Q\_bc \mid Q\_s)$ |
| 1021 | Generate | | $d\_bs = PRNG() \# [0..q-1]$ |
| 1022 | Determine | | $Z = [d\_bs . d\_s\_\{n+1\}] Q\_bc$ |
| 1023 | Determine | | $Q\_bs = [d\_bs] . Q\_s\_\{n+1\}$ |
| 1024 | Determine | | $sID\_s = x\text{-coord}(Q\_bs)$ |
| 1025 | Determine | | $sk\_s \mid sk\_c = KDF(Z, sID\_s, sID\_c)$ |
| 1026 | Determine | | $sig\_s = sign(d\_s, C\_s\_\{n+1\} \mid SD\_s \mid Q\_bs \mid Q\_c)$ |
| 1027 | Generate | | $enc\_s = AEAD(sk\_s, C\_s\_\{n+1\} \mid SD\_s \mid sig\_s \mid PAD\_s, Q\_bs)$ |
| 1028 | Zeroize | | $sk\_s, Z, d\_bs$ |
| 1029 | Transmit | <-------------------- $Q\_bs, enc\_s$ | |
| 1030 | Validate | $Q\_bs$ | |
| 1031 | Determine | $Z = [d\_bc] . Q\_bs$ | |
| 1032 | Determine | $sID\_s = x\text{-coord}(Q\_bs)$ | |
| 1033 | Determine | $sk\_s \mid sk\_c = KDF(Z, sID\_s, sID\_c)$ | |
| 1034 | Zeroize | $Z, d\_bc$ | |
| 1035 | Determine | $d\_bs \mid C\_s\_\{n+1\} \mid SD\_s \mid sig\_s \mid PAD\_s = AEAD\text{-}1(sk\_s, enc\_s, Q\_bs)$ | |
| 1036 | Determine | $Q\_s\_\{n+1\} = PubK(C\_s\_\{n+1\})$ | |
| 1037 | Validate | $C\_s\_\{n+1\}$ signature, $Q\_s\_\{n+1\}$ | |
| 1038 | Validate | $verify(Q\_s, sig\_s, C\_s\_\{n+1\} \mid SD\_s \mid Q\_bs \mid Q\_c)$ | |

*FIG. 10*

| | | IFD (client) | ICC (server) |
|---|---|---|---|
| 1101 | Store | $Q\_s\_\{n\}, C\_s\_\{n\}, SD\_c, ID\_s, C\_c, d\_c, Q\_c = [d\_c]P, seed$ | $d\_s\_\{n\}, C\_s\_\{n\}, Q\_s\_\{n\} = [d\_s\_\{n\}]P, SD\_s, d\_s\_\{n+1\}, C\_s\_\{n+1\}, Q\_s\_\{n+1\} = [d\_s\_\{n+1\}]P$ |
| 1102 | Generate | $d\_bc = PRNG() \# [0..q-1]$ | |
| 1103 | Determine | $Q\_bc = [d\_bc] . P$ | |
| 1104 | Determine | $Z\_1 = [d\_bc] . Q\_s\_\{n\}$ | |
| 1105 | Determine | $sID\_c = x\text{-coord}(Q\_bc)$ | |
| 1106 | Determine | $sk\_1\_c = KDF(Z\_1, ID\_s, sID\_c)$ | |
| 1107 | Determine | $(sigc\_L, rand\_c) = Sign\_L()$ | |
| 1108 | Generate | $enc\_c = AEAD(sk\_1\_c, seed \mid SD\_c \mid C\_c \mid sigc\_L \mid PAD\_c, Q\_bc)$ | |
| 1109 | Determine | $sigc\_R = Sign\_R(d\_c, rand\_c, enc\_c)$ | |
| 1110 | Zeroize | $Z\_1, s\_1\_c$ | |
| 1111 | Transmit | $Q\_bc, enc\_c, sigc\_R$ | ----------------------> |
| 1112 | Validate | | $Q\_bc$ |
| 1113 | Determine | | $Z\_1 = [d\_s\_\{n\}] . Q\_bc$ |
| 1114 | Determine | | $sID\_c = x\text{-coord}(Q\_bc)$ |
| 1115 | Determine | | $sk\_1\_c = KDF(Z\_1, ID\_s, sID\_c)$ |
| 1116 | Determine | | $seed \mid SD\_c \mid C\_c \mid sigc\_L \mid PAD\_c = AEAD-1(sk\_1\_c, enc\_c, Q\_bc)$ |
| 1117 | Validate | | seed |
| 1118 | Zeroize | | $sk\_1\_c, Z\_1$ |
| 1119 | Determine | | $Q\_c = PubK(C\_c)$ |
| 1120 | Validate | | $C\_c$ signature, $Q\_c$ |
| 1121 | Validate | | $PrivVerify(Q\_c, sigc\_L, Sigc\_R, enc\_c)$ |
| 1122 | Generate | | $d\_bs = PRNG() \# [0..q-1]$ |
| 1123 | Determine | | $Z = [d\_bs . d\_s\_\{n+1\}] Q\_bc$ |
| 1124 | Determine | | $Q\_bs = [d\_bs] . Q\_s\_\{n+1\}$ |
| 1125 | Determine | | $sID\_s = x\text{-coord}(Q\_bs)$ |
| 1126 | Determine | | $sk\_s \mid sk\_c = KDF(Z, sID\_s, sID\_c)$ |
| 1127 | Determine | | $(sigs\_L, rand\_s) = Sign\_L()$ |
| 1128 | Generate | | $enc\_s = AEAD(sk\_s, C\_s\_\{n+1\} \mid SD\_s \mid sigs\_L \mid PAD\_s, Q\_bs)$ |
| 1129 | Determine | | $Sigs\_R = sign(d\_s, rand\_s, enc\_s)$ |
| 1130 | Zeroize | | $sk\_s, Z, d\_bs$ |
| 1131 | Transmit | <---------------------- | $Q\_bs, enc\_s$ |
| 1132 | Validate | $Q\_bs$ | |
| 1133 | Determine | $Z = [d\_bc] . Q\_bs$ | |
| 1134 | Determine | $sID\_s = x\text{-coord}(Q\_bs)$ | |
| 1135 | Determine | $sk\_s \mid sk\_c = KDF(Z, sID\_s, sID\_c)$ | |
| 1136 | Zeroize | $Z, d\_bc$ | |
| 1137 | Determine | $d\_bs \mid C\_s\_\{n+1\} \mid SD\_s \mid sigs\_L \mid PAD\_s = AEAD-1(sk\_s, enc\_s, Q\_bs)$ | |
| 1138 | Determine | $Q\_s\_\{n+1\} = PubK(C\_s\_\{n+1\})$ | |
| 1139 | Validate | $C\_s\_\{n+1\}$ signature, $Q\_s\_\{n+1\}$ | |
| 1140 | Validate | $PrivVerify(Q\_s, sigs\_L, sigs\_R, enc\_s)$ | |

*FIG. 11*

SECURE COMMUNICATIONS PROVIDING FORWARD SECRECY

BACKGROUND

Ensuring that data is securely communicated between computers continues to be a concern. For instance, an attacker may intercept communications (e.g., by conducting a man-in-the-middle attack) and infer the identity a client computer or a server computer based on public keys or other data that are exchanged unencrypted. The intercepted data could be used to track the computers or used for illicit purposes. However, preventing the computer's identity from being tracked while still allowing the computer to authenticate itself can be problematic because the authentication can depend on the computer identifying itself. In addition, the encryption keys on the computers performing the communications may later become compromised, enabling an attacker to decrypt previously intercepted communications. Conducting secure, non-traceable, and authenticatable communications while ensuring the security of past communications can pose a challenge.

Embodiments of the present invention address these and other problems individually and collectively.

BRIEF SUMMARY

Embodiments of the invention relate to systems and methods for secure communications. Embodiments of the invention can establish secure communications using a single non-traceable request message from a first computer and a single non-traceable response message from a second computer. Non-traceability may be provided through the use of blinding factors. The request and response messages can also include signatures that provide for non-repudiation. In addition, the encryption of the request and response message is not based on the static keys pairs, which are used for validation of the signatures. As such, perfect forward secrecy is maintained.

Other embodiments are directed to systems, portable consumer devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 9 shows a table of steps in a computer-implemented method to establish secure and non-traceable communications having perfect forward secrecy, in accordance with some embodiments.

FIG. 10 shows a table of steps in a computer-implemented method to establish secure and non-traceable communications having perfect forward secrecy between a client computer and a sever computer such that the client computer and the server computer cannot repudiate their messages, in accordance with some embodiments.

FIG. 11 shows a table of steps for performing a computer-implemented method to establish secure and non-traceable communications having perfect forward secrecy and using an encrypted signature portion and an unencrypted signature portion, in accordance with some embodiments.

Figure 1:
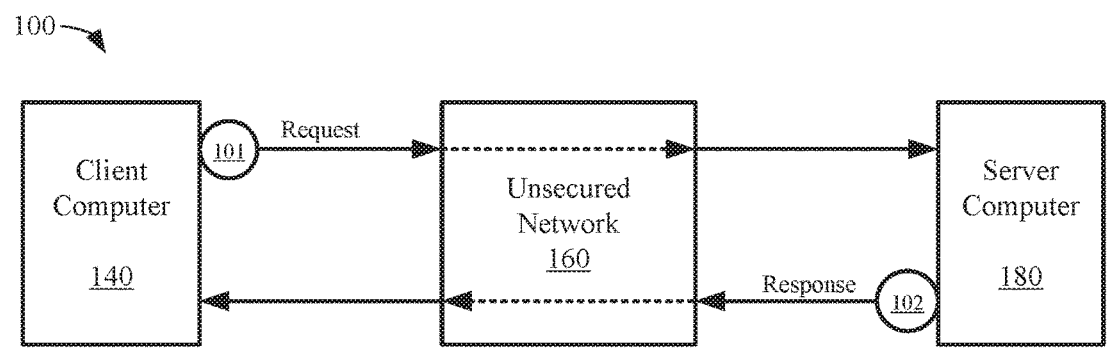
FIG. 1 shows a simplified message flow diagram illustrating secure communications between a client computer and a server computer, in accordance with some embodiments.

In the drawings, dotted or dashed lines may be used to indicate organizational structure, to indicate that an element is optional, or to indicate that data or information is passed through an element substantially unchanged. Arrows may be used to indicate the flow of data or information between two or more elements. Circles having reference numbers may indicate that certain steps are performed by an adjacent element.

TERMS

Prior to discussing embodiments of the invention, description of some terms may be helpful in understanding embodiments.

The term "server computer" may include a computer or cluster of computing devices. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "public/private key pair" may include a pair of linked cryptographic keys generated by an entity (e.g., a computer or an electronic device). The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature" may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" or "digital certificate" may include an electronic document or data file that uses a digital signature to bind a public key with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate is signed by a certificate authority.

A "certificate authority" (CA) may include one or more server computers operatively coupled to issue certificates to entities. The CA may prove its identity using a CA certificate, which includes the CA's public key. The CA certificate may be signed by another CA's private key, or may be signed by the same CA's private key. The latter is known as a self-signed certificate. The CA may maintain a database of all certificates issued by the CA, and may also maintain a list of revoked certificates.

In a typical process, the certificate authority receives an unsigned certificate from an entity whose identity is known. The unsigned certificate includes a public key, one or more data fields, and a hash of the data in the certificate. The CA signs the certificate with a private key corresponding to the public key included on the CA certificate. The CA may then store the signed certificate in a database, and issue the signed certificate to the entity.

A "cryptographic nonce" may include any number, string, bit sequence, or other data value intended to be used in association with a single communication session. In some cases, a cryptographic nonce may be randomly or pseudo-randomly generated. Typically, a cryptographic nonce is of sufficient length as to make insignificant the likelihood of independently generating the same nonce value multiple times.

A "blinded key," such as a "blinded public key" may include a key that has been obfuscated or otherwise modified from its original value by combination with another data element, such as a cryptographic nonce. For example, in elliptic curve cryptography, a public key may be multiplied by the nonce to generate a "blinded public key." Similarly, a private key may be multiplied by the nonce to generate a "blinded private key." The nonce may have the same bit-length as the public key and the private key.

An "ephemeral key pair" may include a public key (i.e., an "ephemeral public key") and a private key (i.e., an "ephemeral private key) generated for use with a single transaction or other communication session. The ephemeral key pair may be of any suitable format, such as ECC or RSA. Typically, an ephemeral key pair may is deleted once the transaction or communication session has concluded.

A "static key pair" may include a public key (i.e., a "static public key") and a private key (i.e., a "static private key") maintained over a period of time. Typically, though not necessarily, a static private key may be stored securely, such as in a hardware security module (HSM) or secure element (SE). Typically, though not necessarily, a static public key may be bound to an identity through the use of a digital certificate. The static key pair may be of any suitable format, such as ECC or RSA.

A "shared secret" may include any data value or other information known only to authorized parties in a secure communication. A shared secret can be generated in any suitable manner, from any suitable data. For example, a Diffie-Hellman based algorithm, such as Elliptic-Curve Diffie-Hellman (ECDH) may be used to generate a shared secret from a private key and a public key. For example, a first computer may generate a first key pair include a first public key and a first private key. A second computer may generate a second key pair including a second public key and a second private key. The first computer may generate a shared secret using the second public key of the second computer and the first private key of the first computer. The second computer may generate the same shared secret using the first public key of the first computer and the second private key of the second computer. The first computer and the second computer may both use the shared secret to generate a session key.

The term "identification data" may include any data or information associated with a user or device. Examples of identification data may include a name of a user associated with the device, an organization associated with the device, payment information such as a primary account number (PAN) associated with the device, an expiration date of the device, a certificate associated with the device, an IMEI or serial number of the device, etc.

The term "authentication" generally refers to a process of establishing confidence in the identity of a user or a computer. Authentication may be performed by confirming the identity of a device using public key cryptography (e.g., encrypted data or digital signatures) for authentication information.

The term "authentication data" or "authentication information" may include any data or information suitable to authenticate a user or device. Examples of authentication data may include a password or passphrase, a secret key (e.g., a private key), a digital signature, an indication that the device is storing certain information, etc.

An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key.

A "session key" may include any key used to encrypt or decrypt data to be securely communicated. In some cases, a session key may be generated from a shared secret known both to a sending entity and a receiving entity. For example, the session key may be derived using a key derivation function and the shared secret.

"Non-traceability" is a characteristic of secure communications that refers to the ability of a communication message to not disclose information about the identity of the sender such that the message can be traced back to them. For example, in some secure communications, the static public key of a first computer is sent to a second computer in the clear (e.g., not encrypted) during a Diffie-Hellman key exchange. The first computer's public key may be static because it corresponds to a certificate stored thereon that is signed by a certificate authority. As such, the first computer may be identified and tracked by intercepting its communications based on an unencrypted public key sent during the Diffie-Hellman key exchange. In another scenario, a signature may be sent unencrypted and a third party may intercept the signature and attempt to validate the signature using a plurality of different public keys to identify and trace the signer of the signature. To prevent tracking, a computer can generate an ephemeral key pair to be used during a key exchange and then deleted after a shared secret is established. Another way to prevent tracking would be to "blind" the public key using a cryptographic nonce (e.g., a randomly generated number).

"Non-repudiation" is a characteristic of secure communications that refers to the ability of a communication message that prevents the sender of the message from denying that they sent that message. A secure communication protocol that provides "non-repudiation" may prevent a computer from denying that a message was sent by them using public key cryptography. In addition, "non-repudiation" provides for "authentication" of the sender since the receiver can authenticate that only the sender could have sent the message. In one example, an encrypted message may include a signature created using the static private key of a first computer. The static private key may correspond to a static public key which is included in a certificate of the first computer that is signed by a certificate authority. In this example, the private key is only known by the first computer and it would be computationally impractical for another computer to determine this private key due to the characteristics of public key cryptography. Accordingly, the first computer may not repudiate the first message if its public key can validate the signature since no other device may have access to its private key to create the signature. In contrast to a signature, encryption of a message alone may not provide non-repudiation of that message since there may not be a provable method for verifying which device generated that message.

"Forward secrecy" is a characteristic of secure communications that refers to the ability of the messages to not be decrypted if the private keys of the sender and/or the receiver of the messages are later compromised. "Perfect forward secrecy" is a characteristic of secure communications that refers to the ability of the messages to not be decrypted if the private keys of both the sender and the receiver of the messages are later compromised. In one scenario, the private keys may be obtained by a third party that gains physical access to the computers. In another scenario, a third computer can spend a long enough time to crack the private key, which would be impractical but not impossible. However, secure communications having "perfect forward secrecy" cannot be decrypted even if the static private keys of the sending and receiving computers are both compromised. One way to achieve "perfect forward secrecy" is by not encrypting the messages using static private keys. Accordingly, if the static private keys are compromised, they cannot be used to decrypt the messages. In one example, an encryption key pair can be randomly generated for the key exchange and then deleted (e.g., zeroized) shortly thereafter. Accordingly, the private key cannot be obtained if a third party later gains physical access to the computer. Therefore, communications sent in the past maintain their secrecy going forward. Furthermore, even if one message is compromised, the other messages are not compromised because there is no single key used for encryption across different messages.

DETAILED DESCRIPTION

Secure communication methods and systems are described herein. In one embodiment, a first computer and a second computer may communicate over an unsecured network (e.g., the Internet). In order to exchange secure communications, the first computer and the second computer may share a secret symmetric key used to encrypt communications. To prevent a third party from obtaining the secret symmetric key, the two computers can exchange public keys and then separately generate the same secret symmetric key using their own private key and the public key received from the other device. However, if static public keys are sent over the network unencrypted, this may allow a third party to determine the identity of one of the computers or to eventually determine the shared symmetric key.

It is possible to use ephemeral key pairs or blinded public keys to provide non-traceability. However, since the identity of the sender is hidden to provide non-traceability, one consequence may be that the sender can deny having sent the message themselves. In order to prevent the sender from repudiating messages that they sent, the message can include a signature that is created using the static public key of the sender. As such, non-traceable keys may be used for encryption while traceable keys may be used to generate the signature. In addition, new and different public keys may be used in each key exchange and deleted immediately or shortly after establishing a shared secret. In addition, while traceable signatures may be used, they may be included in the encrypted portion of the message such that they cannot be used to trace the sender or the receiver of the message. Accordingly, secure communications having "non-traceability," "non-repudiation", and "perfect forward secrecy" can be established. Methods and systems for establishing such communications are described in further detail below.

I. Securing Communications Using Encryption Keys

A Diffie-Hellman key exchange may enable a first computer and a second computer to establish a secret symmetric key over an unsecured network without transmitting the secret symmetric key itself. The Diffie-Hellman key exchange may not be based on any information previous stored at the first or second computer before the key exchange. For example, a Diffie-Hellman based algorithm, such as Elliptic-Curve Diffie-Hellman (ECDH) may be used to generate a shared secret from a private key of a first computer and a public key of a second computer. For example, the first computer may generate a first key pair include a first public key and a first private key. The second computer may generate a second key pair including a second public key and a second private key. The first computer may send its first public key to the second computer and the second computer may send its second public key to the first computer. The first computer may generate a shared secret using the second public key of the second computer and the first private key of the first computer. The second computer may generate the same shared secret using the first public key of the first computer and the second private key of the second computer. The first computer and the second computer may both use the shared secret to generate a session key for encrypting communications. As such, the first computer and the second computer may establish secure communications over an unsecured network without using any pre-installed information.

FIG. 1 shows a simplified message flow diagram 100 illustrating secure communications between a client computer 140 and a server computer 180, in accordance with some embodiments. The message flow diagram 100 may be used between any first computer and any second computer. The client/server distinction used herein is merely exemplary and made to improve readability. In some embodiments, the client computer 140 may perform the operations described as being performed by the server computer 180. In some embodiments, the server computer 180 may perform the operations described as being performed by the client computer 140.

Referring to FIG. 1, the client computer 140 may store a client key pair comprising a client public key and a client private key corresponding to the client public key. The client key pair may be static. The server computer 180 may store a server key pair comprising a server public key and a server private key corresponding to the server public key. The server key pair may be static. The client computer 140 and the server computer 180 may communicate over an unsecured network 160 (e.g., the internet or a wireless local area network). The unsecured network 160 may be "unsecured" in that the communication medium itself is not physically secured or it may be "unsecured" in that communications do not travel directed between two parties but also through other third parties in the network.

The client computer 140 and the server computer 180 may perform a key exchange in order to establish secure communications over the unsecured network 160. For example, the client computer 140 and the server computer 180 may perform a Diffie-Hellman key exchange as described above to establish a shared secret between the client computer 140 and the server computer 180. The client computer 140 and the server computer 180 may each derive a session key from the shared secret for encrypting and decrypting communications between each other.

At 101, the client computer 140 can transmit a request message to the server computer 180 to initiate the establishment of secure communication. In some embodiments, the request message may include identification data. The client computer 140 may encrypt the identification data of the response message using the shared secret to obtain encrypted identification data. The client computer 140 may transmit the request message including the encrypted identification data to the server computer 180 over the unsecured network 160.

The server computer 180 can receive the request message from the client computer 140 via the unsecured network 160. The server computer 180 can decrypt the encrypted identification data of the request message using the shared secret (e.g., using the session key derived from the shared secret). The server computer 180 may also verify the identification data based on data stored at the server computer 180. The server computer 180 may then encrypt payload data for the client computer 140 using the shared secret to obtain encrypted payload data. In some embodiments, the server computer 180 can generate a second shared secret to use for encrypting the server computer's payload data.

At 102, the server computer 180 can transmit a response message including the encrypted payload data to client computer 140. The server computer 180 may transmit the response data to the client computer 140 in response to verifying the identification data received from the client computer 140. The client computer 140 can receive the response message and decrypt the encrypted payload data using the session key to obtain the payload data from the server computer 180. As such, the client computer 140 and the server computer 180 can establish secure communications over the unsecured network 160 by performing a Diffie-Hellman key exchange.

However, the key exchange described above with respect to FIG. 1, may involve a first computer (e.g., the client computer 140) sending its first public key to a second computer (e.g., the server computer 180) and the second computer sending its second public key to the first computer. As such, an eavesdropping computer can intercept the messages to track the identity of the first computer based on the first public key and to track the identity of the second computer based on the second public key. In addition, the eavesdropping computer may conduct a man-in-the-middle attack or imitate the first computer or the second computer. Some of the embodiments described below address these issues.

II. Secure and Non-Traceable Communications

As discussed above, a public key exchange (e.g., a Diffie-Hellman key exchange) can include sending static public keys in the clear (e.g., unencrypted). If there is no other means for secure communications between two computers, then the public keys cannot be encrypted themselves. However, it is possible for a third party computer to intercept the communications (e.g., because they are sent over an unsecured network such as the Internet) and identify the two computers based on their static public keys. This can enable the third party to trace the computers.

A. Method for Establishing Secure and Non-Traceable Communications

Traceability of messages is a problem because it can enable a third party computer to track certain computers, thereby violating the confidentiality of the communications and the privacy of the computer and its users. To solve the traceability problem, a client computer can generate an ephemeral key pair that is different from its static key pair and use the ephemeral public key in the key exchange. The client computer can delete this ephemeral key pair after a shared secret has been established and generate new ephemeral key pairs in establishing subsequent secure communication channels. As such, exchanging an ephemeral public key in the clear does not enable an intercepting third party to track the client computer since that particular ephemeral public key is only used by the client in that single communication session.

Figure 2:
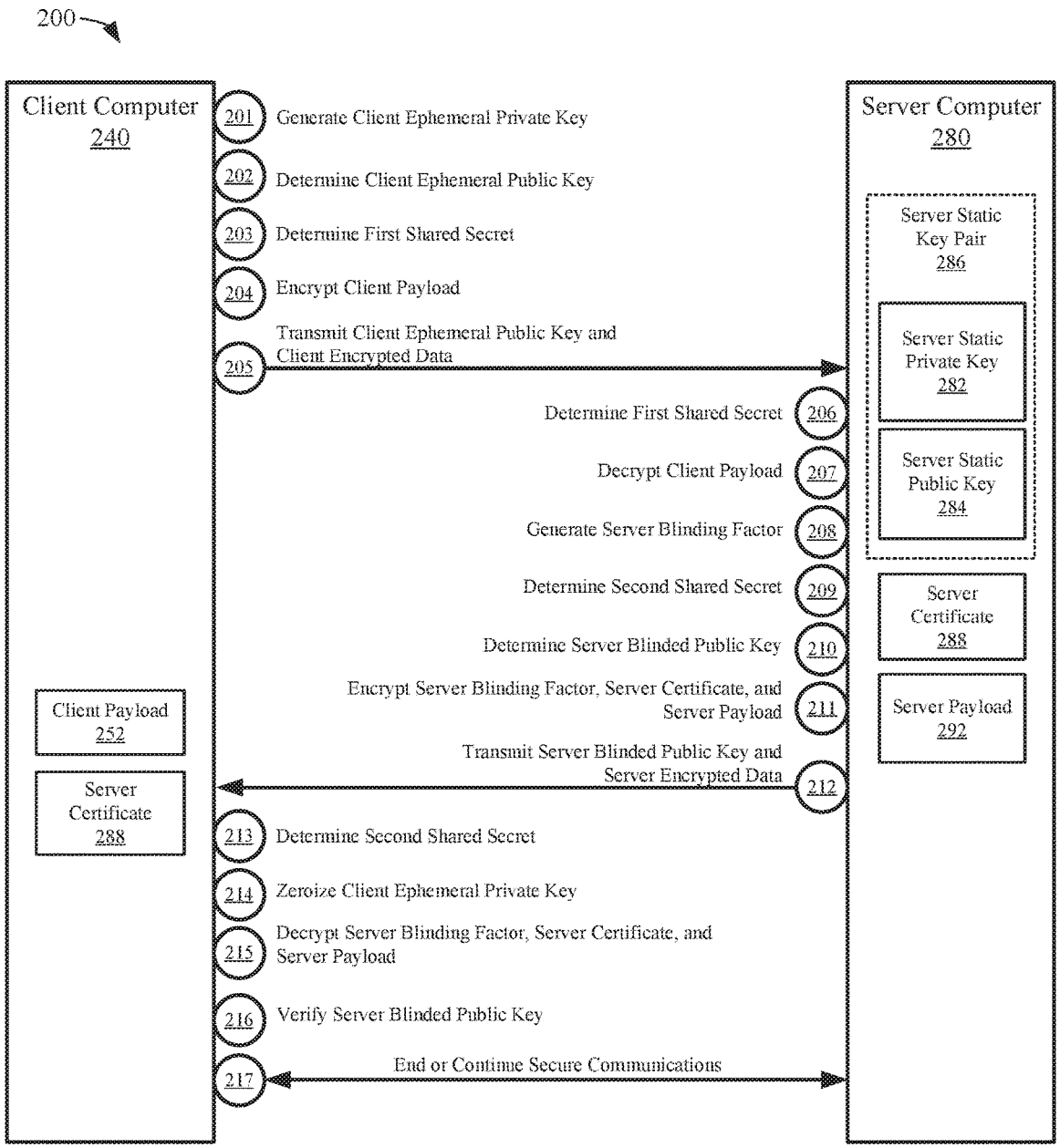
FIG. 2 shows a message flow diagram of a client computer and a server computer establishing secure communications using non-traceable messages, in accordance with some embodiments.

FIG. 2 shows a message flow diagram 200 of a client computer 240 and a server computer 280 establishing secure communications using non-traceable messages, in accordance with some embodiments. Prior to the message flow of FIG. 2, the client computer 240 can store a client payload 252 and a server certificate 288 of the server computer 280. The client computer 240 may obtain the server computer's certificate 288 using the message flow described below with respect to FIG. 3, for example.

The server computer 280 can store a server static key pair 286 including a server static private key 282 and a server static public key 284. The server computer 280 can also store the server certificate 288. The server certificate 288 may include the server static public key 284 and a signature of a certificate authority for authentication of the server computer 288. The server static private key 282 and a server static public key 284 may be "static" in that they do not change over time, enabling the server computer 288 to be authenticated using the server certificate 288. The server computer 280 can also store server payload data 292. The server payload data 292 may be treated as sensitive data such that it is not transmitted in the clear without being encrypted.

In this message flow, the client computer 240 can initiate the establishment of secure communications. At 201, the client computer 240 can generate a client ephemeral private key. The client ephemeral private key may be randomly generated.

At 202, the client computer 240 can determine a client ephemeral public key using the client ephemeral private key. The client ephemeral private key and the client ephemeral public key can form a key pair for use in public key cryptography.

At 203, the client computer 240 can determine a first shared secret using the client ephemeral private key and the server static public key 284, which can be included in the server certificate 288. The client computer 240 may determine a first session key using a key derivation function based on the shared secret, an identifier of the server computer 280, and an identifier of the communication session.

At 204, the client computer 240 can encrypt the client payload 252 using the first shared secret (e.g., using the first session key) to determine client encrypted data. The client payload 252 may include sensitive client data and/or a request for certain data or information from the server computer 280. After encrypting the client payload 252, the client computer 240 can zeroize (e.g., completely delete to prevent any recovery) the first shared secret and the first session key.

At 205, the client computer 240 can transmit a "request message" including the client ephemeral public key and the client encrypted data to the server computer 280. The client ephemeral public key can be sent in the clear (e.g., unencrypted). The request message can indicate that the client computer 240 requests to establish secure communications using a shared secret based on the client blinded public key. The request message may be transmitted over an unsecured network. The server computer 280 can receive the request message from the client computer 240. Since the client ephemeral public key is only used for this communication session (the client ephemeral private key is zeroized at 214), then it cannot be used to track the client computer 240. As such, the request message sent at 205 is non-traceable.

At 206, the server computer 280 can determine the first shared secret using the server static private key 282 and the client blinded public key. The first shared secret determined by the server computer at 206 using the server static private key 282 and the client blinded public key can be the same as the first shared secret generated by the client computer 240 at 203 using the client ephemeral private key and the server static public key 284. The server computer 280 may also may determine the same first session key determined by the client computer 240 using a key derivation function based on the shared secret, an identifier of the server computer 280, and an identifier of the communication session.

At 207, the server computer 280 can decrypt the client encrypted data using the first shared secret (e.g., using the first session key) to obtain the client payload 252. After decrypting the client payload 252, the server computer 280 can zeroize (e.g., completely delete to prevent any recovery) the first shared secret and the first session key. At this point, the server computer 280 may process the client payload 252 and generate or identify any appropriate data or information to include in the server payload 292 to be provided in response to the client computer's request.

At 208, the server computer 280 can generate a server blinding factor. The server blinding factor can be a randomly generated cryptographic nonce. The server computer 280 can use the server blinding factor to prevent third parties from tracking it as described below. For example, the server computer 280 can apply the server blinding factor to the server static public key 284 (e.g., using multiplication) to determine a server blinded public key. The server computer 280 may only this server blinding factor and this server blinded public key in this particular communication session with the client computer 240 and may generate a different blinding factor for subsequent communications sessions. As such, the server computer 280 may not be tracked by third parties based on the server blinded public key.

At 209, the server computer 280 can determine a second shared secret using the server blinding factor, the server static private key 282, and the client ephemeral public key. The server computer 280 may also determine a second session key using a key derivation function and the second shared secret.

At 210, the server computer 280 can determine the server blinded public key using the server blinding factor and the server static public key. For example, the server computer 280 can apply the server blinding factor to the server static public key 284 (e.g., using multiplication) to determine the server blinded public key.

At 211, the server computer 280 can encrypt the server blinding factor, the server certificate 288, and the server payload data 292 using the second shared secret (e.g., using the second session key) to obtain encrypted server data.

At 212, the server computer 280 can transmit a response message including the server blinded public key and the server encrypted data to the client computer 240. The response message may be sent over an unsecured network. The server blinded public key can be sent in the clear (e.g., unencrypted). However, the server blinded public key is based on the server blinding factor which may only be used in this particular communication session. Accordingly, the server computer 280 may not be tracked by a third party intercepting this message and other messages sent by the server computer 280. The client computer 240 can receive the response message.

At 213 the client computer 240 can determine the second shared secret using the client ephemeral private key and the server blinded public key. The second shared secret determined by the client computer 240 at 213 may be the same as the second shared secret determined by the server computer 280 at 209 using the client ephemeral public key, the server blinding factor, and the server static private key 284. The client computer 240 may also determine the same second session key (as also determined by the server computer 280) using a key derivation function and the second shared secret.

At 214, after determining the second shared secret and the second session key, the client computer 240 can zeroize the client ephemeral private key. That is, the client computer 240 can delete the client ephemeral private key such that it cannot be recovered later. Furthermore, even if the client ephemeral private key were compromised and obtained by a third party in the short period of time prior to it being zeroized, the third party would not be able to decrypt any other communications using the client ephemeral private key since this client ephemeral private key was only used to decrypt this particular response message.

At 215, the client computer 240 can decrypt the encrypted server data using the second shared secret (e.g., using the second session key) to obtain the server blinding factor, the server certificate 288, and the server payload 292.

At 216 the client computer 240 can verify the server blinded public key by recreating it using the server blinding factor and the server static public key 284 that is included in the server certificate 288. The client computer 240 can authenticate that the server computer 280 sent the response message based on the server blinded public key being verified.

At 217, the client computer 240 and the server computer 280 may end the communication session or they may continue secure communications using the second session key.

The message flow of FIG. 2 enables the client computer 240 and the server computer 280 to establish secure communications using non-traceable messages, thereby ensuring the confidentiality of the communications and maintaining the privacy of the client computer 240, the server computer 280, and their users. However, the message flow of FIG. 2 requires the client computer 240 to store the server computers server certificate 288, which includes the server static public key 284 used in generating the first shared secret. Accordingly, the client computer 240 needs to have previously obtained the server certificate 288.

B. Method for Obtaining a Certificate Using Non-Traceable Communications

As discussed above, traceability of messages is a problem because it can enable a third party computer to track certain computers, thereby violating the confidentiality of the communications and the privacy of the computer and its users. To solve the traceability problem, a client computer can generate an ephemeral key pair that is different from its static key pair. As described above with reference to FIG. 2, a client computer can send the ephemeral public key to the server computer without violating confidentiality or privacy. However, if the client computer is not already storing a copy of the server computer's public key (e.g., from the server computer's certificate) then the client computer cannot establish a shared secret with the server computer using public key cryptography. This situation is problematic because the client computer needs to be able to verify that the certificate received in the response message from the server computer is in fact that server computer's certificate (not the certificate of another computer) while the server computer cannot provide its static public key to the client computer in the clear due to the traceability problem described herein. Accordingly, the client computer needs to obtain the server computer's certificate using secure and non-traceable messaging in order to maintain confidentiality and privacy.

Figure 3:
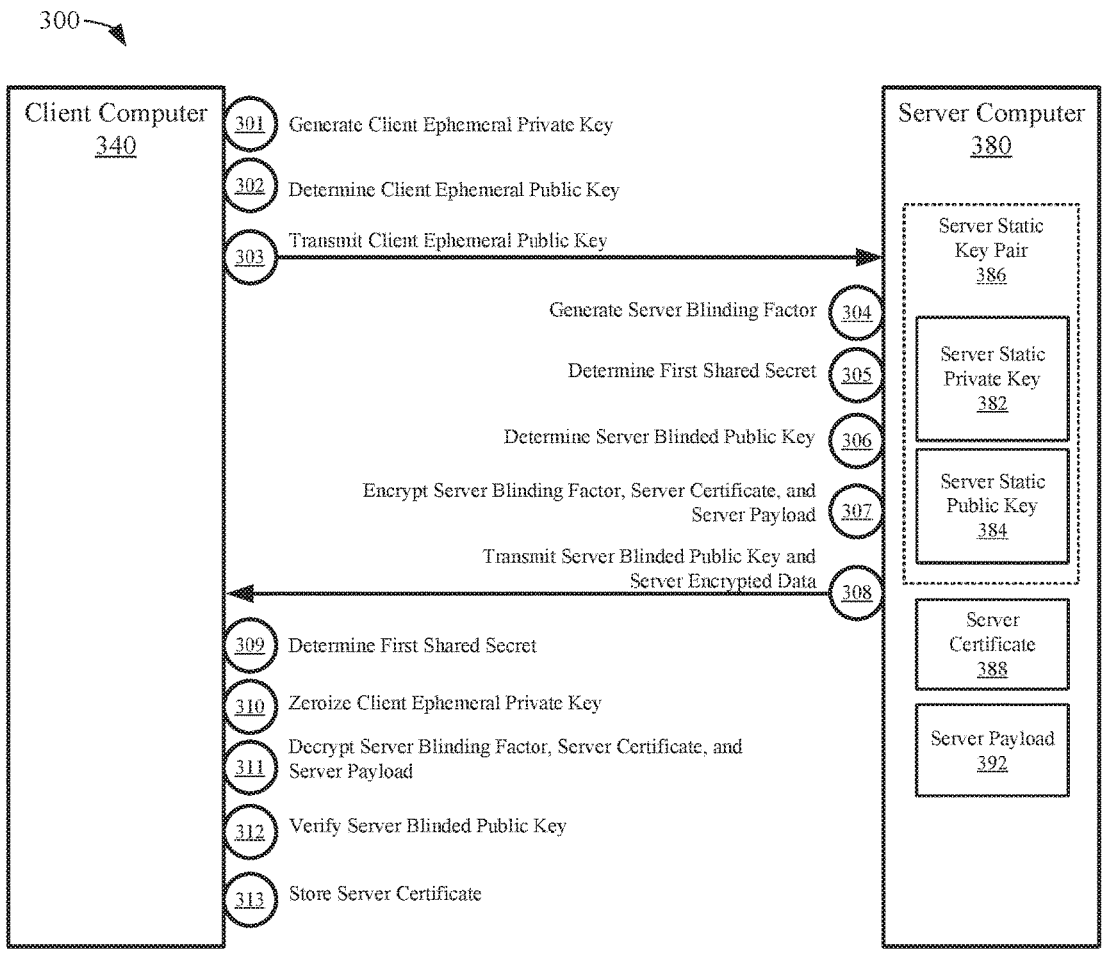
FIG. 3 shows a message flow diagram of a client computer securely obtaining a certificate from a server computer using non-traceable messages, in accordance with some embodiments.

FIG. 3 shows a message flow diagram 300 of a client computer 340 securely obtaining a certificate from a server computer 380 using non-traceable messages, in accordance with some embodiments. Prior to the message flow of FIG. 2, the client computer 340 may not store a server certificate 388 of the server computer 380.

The server computer 380 can store a server static key pair 386 including a server static private key 382 and a server static public key 384. The server computer 380 can also store the server certificate 388. The server certificate 288 may include the server static public key 384 and a signature of a certificate authority for authentication of the server computer 388. The server static private key 382 and a server static public key 284 may be "static" in that they do not change over time, enabling the server computer 388 to be authenticated using the server certificate 388. The server computer 380 can also store server payload data 392. The server payload data 392 may be treated as sensitive data such that it is not transmitted in the clear without being encrypted.

In this message flow, the client computer 340 can initiate the establishment of secure communications. At 301, the client computer 340 can generate a client ephemeral private key. The client ephemeral private key may be randomly generated.

At 302, the client computer 340 can determine a client ephemeral public key using the client ephemeral private key. The client ephemeral private key and the client ephemeral public key can form a key pair for use in public key cryptography.

At 303, the client computer 340 can transmit a "request message" including the client ephemeral public key to the server computer 380. The client ephemeral public key can be sent in the clear (e.g., unencrypted). The request message can indicate that the client computer 340 requests receive the server certificate 388. The request message may be transmitted over an unsecured network. The server computer 380 can receive the request message from the client computer 340. Since the client ephemeral public key is only used for this communication session (the client ephemeral private key is zeroized at 310), then it cannot be used to track the client computer 340. As such, the request message sent at 303 is non-traceable.

At 304, the server computer 380 can generate a server blinding factor. The server blinding factor can be a randomly generated cryptographic nonce. The server computer 380 can use the server blinding factor to prevent third parties from tracking its communications as described below. For example, the server computer 380 can apply the server blinding factor to the server static public key 384 (e.g., using multiplication) to determine a server blinded public key. The server computer 380 may only this server blinding factor and this server blinded public key in this particular communication session with the client computer 340 and may generate a different blinding factor for subsequent communications sessions. As such, the server computer 380 may not be tracked by third parties based on the server blinded public key.

At 305, the server computer 380 can determine a first shared secret using the server static private key 382 and the client ephemeral public key. The server computer 380 may determine a first session key using a key derivation function based on the first shared secret. The server computer 380 can use the first session key to encrypt the server certificate 388 and the server payload 392 for transmission to the client computer 340.

At 306, the server computer 380 can determine a server blinded public key using the server blinding factor and the server static public key 384. For example, the server computer 380 can apply the server blinding factor to the server static public key 384 (e.g., using multiplication) to determine the server blinded public key.

At 307, the server computer 380 can encrypt the server blinding factor, the server certificate 388, and the server payload data 392 using the first shared secret (e.g., using the first session key) to obtain encrypted server data. After encrypting, the server computer 380 may zeroize the first shared secret and the first session key.

At 308, the server computer 380 can transmit a response message including the server blinded public key and the server encrypted data to the client computer 340. The response message may be sent over an unsecured network. The server blinded public key can be sent in the clear (e.g., unencrypted). However, the server blinded public key is based on the server blinding factor which may only be used in this particular communication session. Accordingly, the server computer 380 may not be tracked by a third party intercepting this message and other messages sent by the server computer 380. The client computer 340 can receive the response message.

At 309 the client computer 340 can determine the first shared secret using the client ephemeral private key and the server blinded public key. The first shared secret determined by the client computer 340 at 309 may be the same as the first shared secret determined by the server computer 380 at 305 using the client ephemeral public key, the server blinding factor, and the server static private key 284. The client computer 340 may also determine the same first session key (as also determined by the server computer 380) using a key derivation function and the first shared secret.

At 310, after determining the first shared secret and the first session key, the client computer 340 can zeroize the client ephemeral private key. That is, the client computer 340 can delete the client ephemeral private key such that it cannot be recovered later. Furthermore, even if the client ephemeral private key were compromised and obtained by a third party in the short period of time prior to it being zeroized, the third party would not be able to decrypt any other communications using the client ephemeral private key since this client ephemeral private key was only used to decrypt this particular response message.

At 311, the client computer 340 can decrypt the encrypted server data using the first shared secret (e.g., using the first session key) to obtain the server blinding factor, the server certificate 388, and the server payload 392.

At 312, the client computer 340 can verify the server blinded public key by recreating it using the server blinding factor and the server static public key 384 that is included in the server certificate 388. The client computer 340 can authenticate that the server computer 380 sent the response message based on the server blinded public key being verified.

At 313, the client computer 340 can store the server certificate 388 such that the server static public key 384 it can be used for encryption of subsequent communications with the server computer 380, such as those described above with reference to FIG. 2.

The message flows of FIG. 2 and FIG. 3 enable a client computer and a server computer to establish secure communications using non-traceable messages, even where the client computer does not previously store the server computer's public key. However, the message flows of FIG. 2 and FIG. 3 do not enable the server computer to authenticate the client computer without sending additional messages or including additional data in the request and response messages. As such, a repudiation problem can arise. For example, the client computer may deny having sent the request message. Accordingly, it would be useful for the messages to have the property of "non-repudiation" such that the messages could not have been sent by a computer other than the one storing a particular private key corresponding to a particular public key included in that message. It would also be advantageous for messages from the server computer to also authenticatable data such that the message cannot be repudiated.

Further complicating this problem is the need for the messages to maintain "perfect forward secrecy." That is, the compromise of a computer's private key or one message should not then compromise any prior messages that may have been intercepted. Additionally, the messages should be non-traceable. Further, the use of network and computing resources can be reduced by limiting the message flow for establishing secure communications to just the single request message from the client computer and the single response message from the server computer. Methods and systems that address these problems while using only a single request message from the client computer and a single response message from the server computer are described in further detail below.

III. Secure and Non-Traceable Communications Providing Perfect Forward Secrecy and Non-Repudiation In other message flows, non-traceability can be achieved by blinding the public keys being exchanged in the clear using blinding factors. Such message flows can also achieve mutual authentication of the two computers by included the blinding factors in the encrypted message portions, enabling the receiver of the message to authenticate the sending computer by comparing the blinded public key received in the clear to a matching blinded public key determined by applying the blinding factor to a static public key included in the sender's certificate. However, in such message flows, the blinding factor is used for both encryption and for authentication. Accordingly, if the private keys of both devices are obtained by a third party, the third party can decrypt any new messages and also any previously intercepted messages. For example, the third party can use the server's static private key along with the client's blinded public key (received in the clear in the request message) to generate the shared secret, which can be used to decrypt the client's blinding factor (in the intercepted request message's encrypted payload). Then, the third party can decrypt the response message sent from the server using the client's static private key and the client's blinding factor (obtained from the request message sent to the server). As such, a third party may be able to decrypt previously intercepted messages if they can obtain private keys of both the client and the server. That is, the messages in this example message flow violate "perfect forward secrecy."

Referring back to FIG. 2, that message flow enables the client computer and the server computer to establish secure communications using non-traceable messages, thereby ensuring the confidentiality of the communications and maintaining the privacy of the client computer, the server computer, and their users. However, the client computer cannot authenticate the server computer, and the server computer cannot authenticate the client computer, based on the request and the response alone. That is, the client computer and the server computer cannot authenticate each other without communicating additional data, either in the request or the response, or in additional communication messages.

It would be advantageous to establish secure communications using only a single request message and a single response message wherein the messages have the property of being "non-traceable" while providing for "non-repudiation" of the messages and maintaining "perfect forward secrecy."

Figure 4:
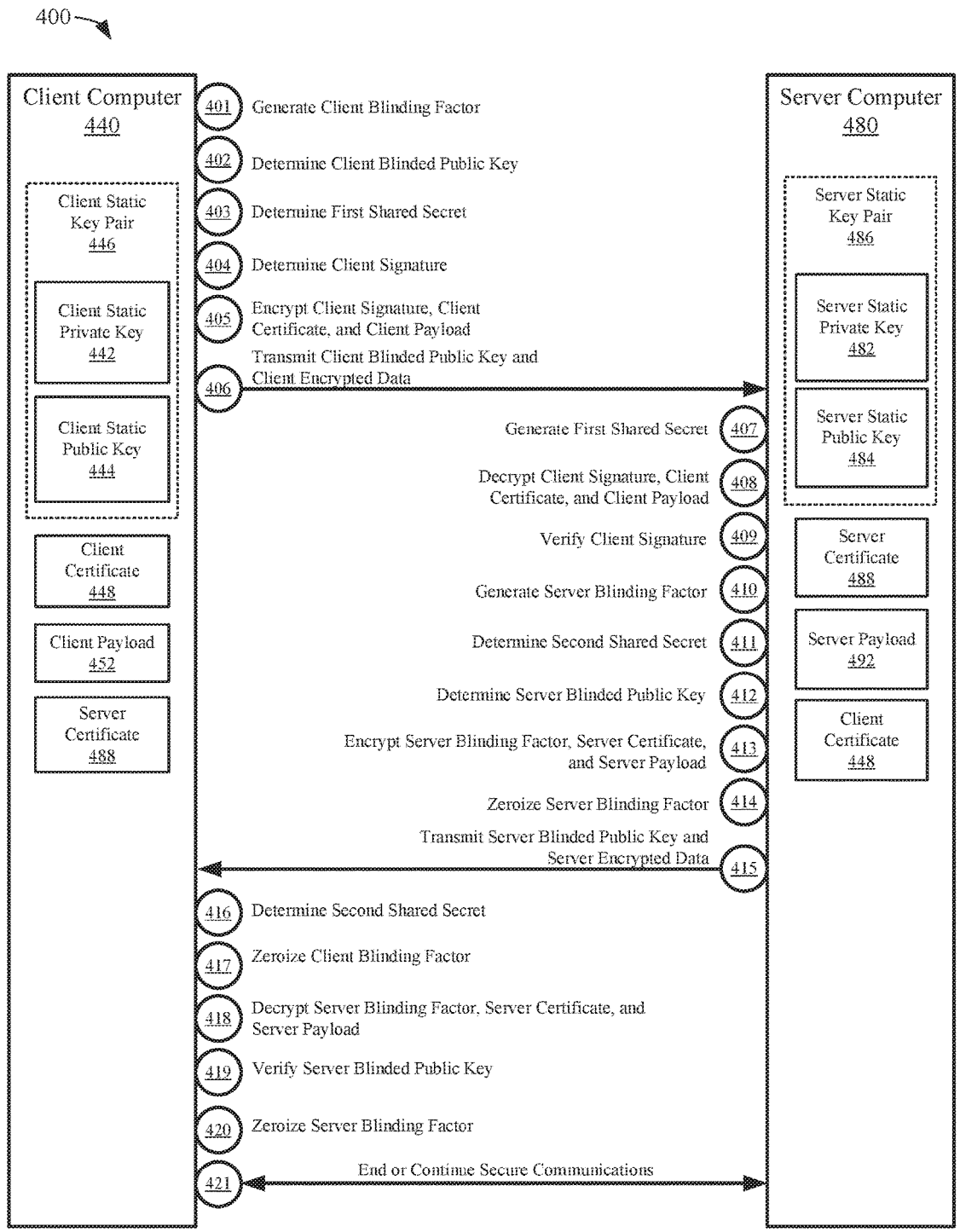
FIG. 4 shows a message flow diagram of a client computer and a server computer establishing secure and non-traceable communications having perfect forward secrecy, in accordance with some embodiments.

A. Secure Communications Providing Perfect Forward Secrecy and Non-Repudiation of the Client FIG. 4 shows a message flow diagram 400 of a client computer 440 and a server computer 480 establishing secure and non-traceable communications having perfect forward secrecy, in accordance with some embodiments. This message flow includes a request message transmitted by the client computer 440 at 406 that cannot be repudiated by the client computer 440. The request message at 406 and the response message from the server computer 480 at 415 are non-traceable since they include ephemeral blinded public keys instead of static public keys. Furthermore, request and response message maintain perfect forward secrecy. The generation and format of the request and response messages are described in further detail below.

In this message flow, the client computer 440 can initiate the establishment of secure communications. Prior to the message flow, the client computer 440 may store a client static key pair 446 including a client static private key 442 and a client static public key 444. The client computer may also store a client certificate 448 that is signed by a certificate authority and that includes the client static public key 444. The client computer 440 can also store the server certificate 488. In addition, the client computer 440 can store client payload data 452, which may be sensitive data.

At 401, the client computer 440 can generate a client blinding factor. The client blinding factor may be randomly generated.

At 402, the client computer 440 can determine a client blinded public key using the client blinding factor. The client blinding factor and the client blinded public key may form an elliptic curve key pair such that the client blinded public key may be used to decrypt data that is encrypted using the client blinding factor and the client blinded public key may be used to validate a signature generated by signing data with the client blinding factor. As such, the client blinding factor may be used as a private elliptic curve key.

At 403, the client computer 440 can determine a first shared secret using the client blinding factor and the server static public key 484, which can be included in the server certificate 488. The client computer 440 may determine a first session key using a key derivation function based on the first shared secret.

At 404, the client computer 440 can determine a client signature by signing (using the client static private key 442) the client payload data 452, the client blinded public key, and the server static public key 484. The client computer 440 may determine the client signature using the Elliptic Curve Digital Signature Algorithm (ECDSA) for example. The client signature can be included in the request message from the client computer 440 to provide non-repudiation of the client computer 440. In addition, the client signature is based on the client blinding factor, which is only used in this communication session (e.g., the single request and single response message). As such, the signature is only valid for this particular request message. Furthermore, the client signature is based on the server static public key 484. As such, another computer may not claim to be the recipient of this particular request message.

In some embodiments, the client signature may also be based on a seed indicating the freshness (e.g., timeliness) of the request message. The seed can also be included in the encrypted client data such that the receiver of the request message can verify that the message is not old, based on the value of the seed. The seed maybe a trusted time or a counter, for example. The server computer 480 may obtain its own trusted time or counter value to verify the seed in the request message.

At 405, the client computer 440 can encrypt the client payload data 452, the client certificate 448, the client signature, and the client blinded public key using the first shared secret (e.g., using the first session key) to determine client encrypted data. The client computer can perform the encryption using the Authenticated Encryption with Associated Data (AEAD) encryption process, for example. The client payload 452 may include sensitive client data and/or a request for certain data or information from the server computer 480. After encrypting the client payload 452, the client computer 440 can zeroize (e.g., completely delete to prevent any recovery) the first shared secret and the first session key.

At 406, the client computer 440 can transmit a "request message" including the client blinded public key and the client encrypted data to the server computer 480. The client blinded public key can be sent in the clear (e.g., unencrypted). The request message can indicate that the client computer 440 requests to establish secure communications using a shared secret based on the client blinded public key. The request message may be transmitted over an unsecured network. The server computer 480 can receive the request message from the client computer 440.

Since the client blinded public key is only used for this communication session (the client blinding factor is zeroized at 417), then it cannot be used to track the client computer 440. As such, the request message sent at 405 is non-traceable.

In addition, the request message sent at 405 provides non-repudiation of the client computer 440 since the client encrypted data includes the client signature, which was generated using the client blinding factor.

In addition, the request message maintains perfect forward secrecy since there is no data included in the request message that can be used to decrypt any data in other messages sent by the client computer 440, in the past or future. Perfect forward secrecy is maintained since the client blinding factor is not provided in the encrypted client data. For instance, the client signature is used for authentication of the client computer 440, instead of using the blinding factor. However, the client signature does not include information that may be used to decrypt messages from the client computer 440 even if the client static private key 442 and the server static private key 482 are compromised.

At 407, the server computer 480 can determine the first shared secret using the server static private key 482 and the client blinded public key that was included in the request message. The first shared secret determined by the server computer at 406 using the server static private key 482 and the client blinded public key can be the same as the first shared secret generated by the client computer 440 at 403 using the client blinding factor and the server static public key 484. The server computer 480 may also may determine the same first session key determined by the client computer 440 using a key derivation function based on the first shared secret.

At 408, the server computer 480 can decrypt the client encrypted data using the first shared secret (e.g., using the first session key) to obtain the client payload data 452, the client certificate 448, the client signature, and the client blinded public key. The server computer may perform the decryption using the Authenticated Encryption with Associated Data (AEAD) decryption process, for example. After decrypting the client encrypted data, the server computer 480 can zeroize (e.g., completely delete to prevent any recovery) the first shared secret and the first session key.

At 409, the server computer 480 can verify the client signature using the client static public key 444, which is included in the client certificate 448, the client payload data 452, the client blinded public key, and the server static public key 484. The server computer 480 may verify the client signature using the Elliptic Curve Digital Signature Algorithm (ECDSA) for example.

The server computer 480 may also validate the certificate chain of the client certificate 448. In addition, the server computer 480 may process the client payload 452 and generate or identify any appropriate data or information to include in the server payload 492 to be provided in response to the client computer's request.

At 410, the server computer 480 can generate a server blinding factor. The server blinding factor can be a randomly generated cryptographic nonce. The server computer 480 can use the server blinding factor to prevent third parties from tracking it as described herein. For instance, the server computer 480 can apply the server blinding factor to the server static public key 484 (e.g., using multiplication) to determine a server blinded public key. The server computer 480 may only this server blinding factor and this server blinded public key in this particular communication session with the client computer 440 (e.g., the request message at 406 and the response message at 415) and may generate a different blinding factor for subsequent communications sessions. As such, the identity of the server computer 480 may not be tracked based on the server blinded public key.

At 411, the server computer 480 can determine a second shared secret using the server blinding factor, the server static private key 482, and the client blinded public key. In some embodiments, the server computer 480 may store multiple static key pairs and it can use a different static key pair for encrypting the response message. The server computer 480 may also determine a second session key using a key derivation function and the second shared secret.

At 412, the server computer 480 can determine the server blinded public key using the server blinding factor and the server static public key. For example, the server computer 480 can apply the server blinding factor to the server static public key (e.g., using multiplication) to determine the server blinded public key. The server static public key used to determine the server blinded public key may be part of a different static key pair as discussed above.

At 413, the server computer 480 can encrypt the server blinding factor, the server certificate (corresponding to the static public key of the static key pair used for encryption), the server payload data 492, and the server blinded public key using the second shared secret (e.g., using the second session key) to obtain encrypted server data. The server computer 480 can perform the encryption using the Authenticated Encryption with Associated Data (AEAD) encryption process, for example.

At 414, the server computer 480 can transmit a response message including the server blinded public key and the server encrypted data to the client computer 440. The response message may be sent over an unsecured network. The server blinded public key can be sent in the clear (e.g., unencrypted). However, the server blinded public key is based on the server blinding factor which may only be used in this particular communication session. Accordingly, the server computer 480 may not be tracked by a third party intercepting this message and other messages sent by the server computer 480. The client computer 440 can receive the response message.

At 416 the client computer 440 can determine the second shared secret using the client blinding factor and the server blinded public key, that was received in the response message. The second shared secret determined by the client computer 440 at 416 may be the same as the second shared secret determined by the server computer 480 at 411 using the client blinded public key, the server blinding factor, and the server static private key. The client computer 440 may also determine the same second session key (as also determined by the server computer 480) using a key derivation function and the second shared secret.

At 417, after determining the second shared secret and the second session key, the client computer 440 can zeroize the client blinding factor. That is, the client computer 440 can delete the client blinding factor such that it cannot be recovered later. Furthermore, even if the client blinding factor were compromised and obtained by a third party in the short period of time prior to it being zeroized, the third party would not be able to decrypt any other communications using the client blinding factor it was only used to decrypt this particular response message. In addition, even if a third part obtains access to both the client computer's static private key and the server computer's static private key, they could not decrypt the response message without obtaining the client blinding factor, which is zeroized shortly after the message is response message is received. Thus, perfect forward secrecy is maintained.

At 418, the client computer 440 can decrypt the encrypted server data using the second shared secret (e.g., using the second session key) to obtain the server blinding factor, the server certificate (corresponding to the static public key of the static key pair used for encryption), the server payload data 492, and the server blinded public key. The client computer 440 can perform the decryption using the Authenticated Encryption with Associated Data (AEAD) decryption process, for example.

At 419, the client computer 440 can verify the server blinded public key by recreating it using the server blinding factor included in the response message and the server static public key of the server certificate that is also included in the response message. The client computer 440 can authenticate that the server computer 480 sent the response message based on the server blinded public key being verified. The client computer 440 may also validate the certificate chain of the server certificate included in the response message.

At 420, the client computer 440 may zeroize the server blinding factor such that it may not be recovered later. As such, a third party would not be able to decrypt the response message even if they obtained access to the static private keys of the client computer 440 and the server computer 480 since either the server blinding factor or the client blinding factor are required for decryption, and they have all been zeroized.

At 421, the client computer 440 and the server computer 480 may end the communication session or they may continue secure communications using the second session key.

The message flow of FIG. 4 enables the client computer 440 and the server computer 480 to establish secure communications using non-traceable messages, thereby ensuring the confidentiality of the communications and maintaining the privacy of the client computer 440, the server computer 480, and their users. In addition, the client computer 480 cannot repudiate the request message since it includes the client signature. Furthermore, the request and response messages maintain perfect forward secrecy since their encryption depends on the client blinding factor and the server blinding factor, which are zeroized immediately after they become unnecessary to the decryption process. In addition, the use of network and computing resources is reduced since this solution is achieved using only one request message and one response message.

Figure 5:
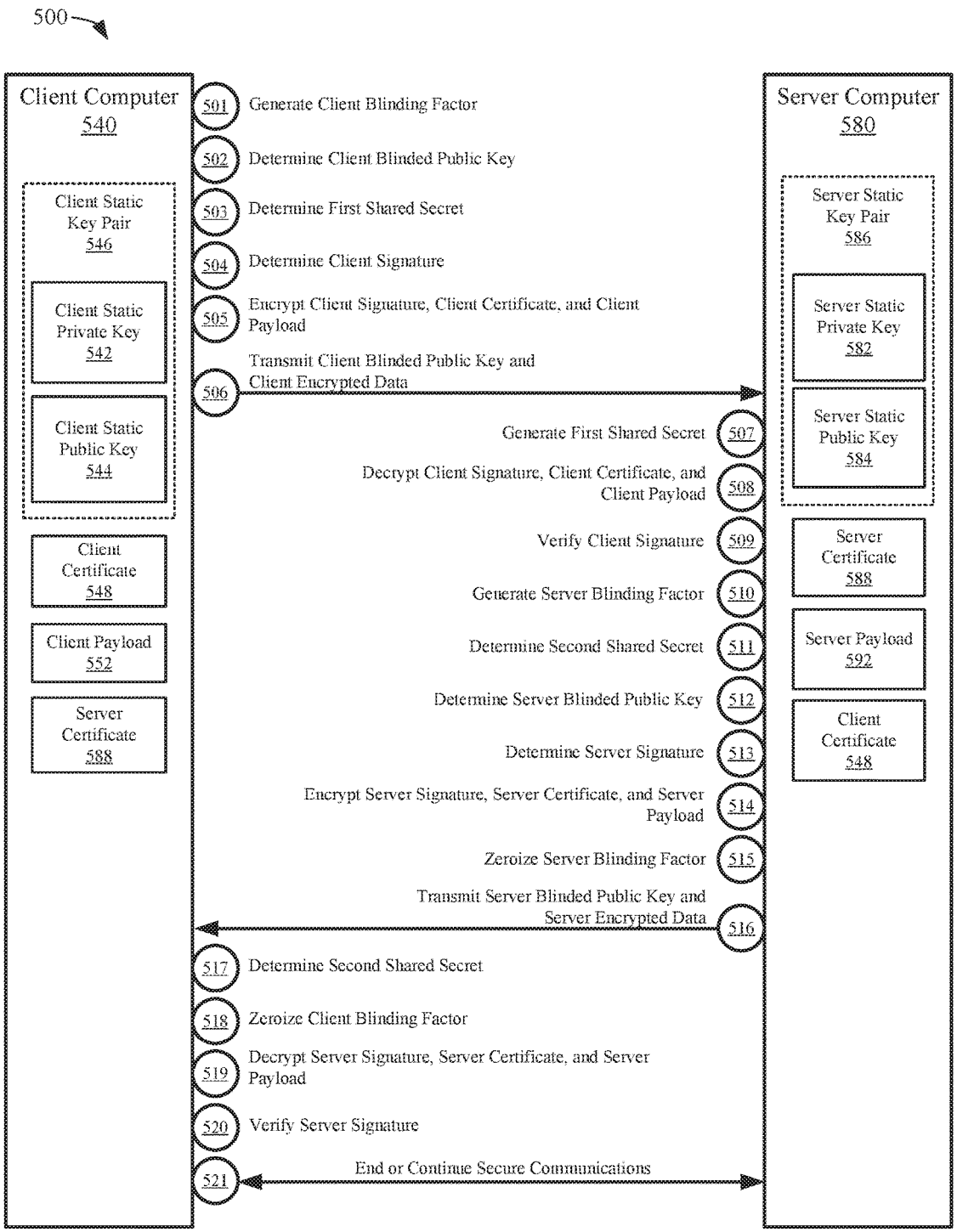
FIG. 5 shows a message flow diagram of a client computer and a server computer establishing secure and non-traceable communications having perfect forward secrecy using messages having client and server non-repudiation, in accordance with some embodiments.

B. Secure Communications Providing Perfect Forward Secrecy and Non-Repudiation of the Client and Server FIG. 5 shows a message flow diagram 500 of a client computer 540 and a server computer 580 establishing secure and non-traceable communications having perfect forward secrecy using messages having client and server non-repudiation, in accordance with some embodiments. This message flow includes a request message transmitted by the client computer 540 at 506 which cannot be repudiated by the client computer 540 and a response message transmitted by the server computer 580 at 516 that cannot be repudiated by the server computer 580. The request message at 506 and the response message at 516 are non-traceable since they include one-time-use blinded public keys instead of static public keys. Furthermore, request and response message maintain perfect forward secrecy. The generation and format of the request and response messages are described in further detail below.

In this message flow, the client computer 540 can initiate the establishment of secure communications. Prior to the message flow, the client computer 540 may store a client static key pair 546 including a client static private key 542 and a client static public key 544. The client computer may also store a client certificate 548 that is signed by a certificate authority and that includes the client static public key 544. The client computer 540 can also store the server certificate 588. In addition, the client computer 540 can store client payload data 552, which may be sensitive data. Certain steps in the message flow diagram 500 of FIG. 5 may be performed in a similar manner to steps in the message flow diagram 400 of FIG. 4.

At 501, the client computer 540 can generate a client blinding factor. The client blinding factor may be randomly generated.

At 502, the client computer 540 can determine a client blinded public key using the client blinding factor. The client blinding factor and the client blinded public key may form an elliptic curve key pair such that the client blinded public key may be used to decrypt data that is encrypted using the client blinding factor and the client blinded public key may be used to validate a signature generated by signing data with the client blinding factor.

At 503, the client computer 540 can determine a first shared secret using the client blinding factor and the server static public key 584, which can be included in the server certificate 588. The client computer 540 may determine a first session key using a key derivation function based on the first shared secret.

At 504, the client computer 540 can determine a client signature by signing the client payload data 552, the client blinded public key, and the server static public key 584. The client computer 540 may determine the client signature using the Elliptic Curve Digital Signature Algorithm (ECDSA) for example. The client signature can be included in the request message from the client computer 540 to provide non-repudiation of the client computer 540. In addition, the client signature is based on the client blinding factor, which is only used in this communication session (e.g., the single request and single response message). As such, the signature is only valid for this particular request message. Furthermore, the client signature is based on the server static public key 584. As such, another computer may not claim to be the recipient of this particular request message.

In some embodiments, the client signature may also be based on a seed indicating the freshness (e.g., timeliness) of the request message. The seed can also be included in the encrypted client data such that the receiver of the request message can verify that the message is not old, based on the value of the seed. The seed maybe a trusted time or a counter, for example. The server computer 580 may obtain its own trusted time or counter value to verify the seed in the request message.

At 505, the client computer 540 can encrypt the client payload data 552, the client certificate 548, the client signature, and the client blinded public key using the first shared secret (e.g., using the first session key) to determine client encrypted data. The client computer can perform the encryption using the Authenticated Encryption with Associated Data (AEAD) encryption process, for example. The client payload 552 may include sensitive client data and/or a request for certain data or information from the server computer 580. After encrypting the client payload 552, the client computer 540 can zeroize (e.g., completely delete to prevent any recovery) the first shared secret and the first session key.

At 506, the client computer 540 can transmit a "request message" including the client blinded public key and the client encrypted data to the server computer 580. The client blinded public key can be sent in the clear (e.g., unencrypted). The request message can indicate that the client computer 540 requests to establish secure communications using a shared secret based on the client blinded public key. The request message may be transmitted over an unsecured network. The server computer 580 can receive the request message from the client computer 540. Since the client blinded public key is only used for this communication session (the client blinding factor is zeroized at 517), then it cannot be used to track the client computer 540. As such, the request message sent at 505 is non-traceable. In addition, the request message sent at 505 provides non-repudiation of the client computer 540 since the client encrypted data includes the client signature, which was generated using the client blinding factor. In addition, the request message maintains perfect forward secrecy since there is no data included in the request message that can be used to decrypt any data in other messages sent by the client computer 540, in the past or future. Perfect forward secrecy is maintained since the client blinded factor is not provided in the encrypted client data. For instance, the client signature is used for authentication of the client computer 540 instead of using the blinding factor. However, the client signature does not include information that may be used to decrypt messages from the client computer 540 even if the client static private key 542 and the server static private key 582 are compromised.

At 507, the server computer 580 can determine the first shared secret using the server static private key 582 and the client blinded public key that was included in the request message. The first shared secret determined by the server computer at 506 using the server static private key 582 and the client blinded public key can be the same as the first shared secret generated by the client computer 540 at 503 using the client blinding factor and the server static public key 584. The server computer 580 may also may determine the same first session key determined by the client computer 540 using a key derivation function based on the first shared secret.

At 508, the server computer 580 can decrypt the client encrypted data using the first shared secret (e.g., using the first session key) to obtain the client payload data 552, the client certificate 548, the client signature, and the client blinded public key. The server computer may perform the decryption using the Authenticated Encryption with Associated Data (AEAD) decryption process, for example. After decrypting the client encrypted data, the server computer 580 can zeroize (e.g., completely delete to prevent any recovery) the first shared secret and the first session key.

At 509, the server computer 580 can verify the client signature using the client static public key 544, which is included in the client certificate 548, the client payload data 552, the client blinded public key, and the server static public key 584. The server computer 580 may verify the client signature using the Elliptic Curve Digital Signature Algorithm (ECDSA) for example.

The server computer 580 may also validate the certificate chain of the client certificate 548. In addition, the server computer 580 may process the client payload 552 and generate or identify any appropriate data or information to include in the server payload 592 to be provided in response to the client computer's request.

At 510, the server computer 580 can generate a server blinding factor. The server blinding factor can be a randomly generated cryptographic nonce. The server computer 580 can use the server blinding factor to prevent third parties from tracking it as described herein. For instance, the server computer 580 can apply the server blinding factor to the server static public key 584 (e.g., using multiplication) to determine a server blinded public key. The server computer 580 may only this server blinding factor and this server blinded public key in this particular communication session with the client computer 540 (e.g., the request message at 506 and the response message at 516) and may generate a different blinding factor for subsequent communications sessions. As such, the identity of the server computer 580 may not be tracked based on the server blinded public key.

At 511, the server computer 580 can determine a second shared secret using the server blinding factor, the server static private key 582, and the client blinded public key. In some embodiments, the server computer 580 may store multiple static key pairs and it can use a different static key pair for encrypting the response message. The server computer 580 may also determine a second session key using a key derivation function and the second shared secret.

At 512, the server computer 580 can determine the server blinded public key using the server blinding factor and the server static public key. For example, the server computer 580 can apply the server blinding factor to the server static public key (e.g., using multiplication) to determine the server blinded public key. The server static public key used to determine the server blinded public key may be part of a different static key pair as discussed above.

At 513, the server computer 580 can determine a server signature by signing the server certificate, the server payload data 592, the server blinded public key, and the client static public key 544. The server computer 580 may determine the server signature using the Elliptic Curve Digital Signature Algorithm (ECDSA) for example. The server signature can be included in the response message from the server computer 580 to provide non-repudiation of the server computer 580. In addition, the server signature is based on the server blinded public key, which is only used in this communication session (e.g., the single request and single response message). As such, the signature is only valid for this particular request message. Furthermore, the server signature is based on the client static public key 544. As such, another computer may not claim to be the recipient of this particular request message.

At 514, the server computer 580 can encrypt the server certificate (corresponding to the static public key of the static key pair used for encryption), the server payload data 492, the server signature, and the server blinded public key using the second shared secret (e.g., using the second session key) to obtain encrypted server data. The server computer 580 can perform the encryption using the Authenticated Encryption with Associated Data (AEAD) encryption process, for example.

At 515, the server computer 580 can zeroize the server blinding factor such that it cannot be recovered.

At 516, the server computer 580 can transmit a response message including the server blinded public key and the server encrypted data to the client computer 540. The response message may be sent over an unsecured network. The server blinded public key can be sent in the clear (e.g., unencrypted). However, the server blinded public key is based on the server blinding factor which may only be used in this particular communication session. Accordingly, the server computer 580 may not be tracked by a third party intercepting this message and other messages sent by the server computer 580. The client computer 540 can receive the response message.

At 517 the client computer 540 can determine the second shared secret using the client blinding factor and the server blinded public key, that was received in the response message. The second shared secret determined by the client computer 540 at 517 may be the same as the second shared secret determined by the server computer 580 at 511 using the client blinded public key, the server blinding factor, and the server static private key. The client computer 540 may also determine the same second session key (as also determined by the server computer 580) using a key derivation function and the second shared secret.

At 518, after determining the second shared secret and the second session key, the client computer 540 can zeroize the client blinding factor. That is, the client computer 540 can delete the client blinding factor such that it cannot be recovered later. Furthermore, even if the client blinding factor were compromised and obtained by a third party in the short period of time prior to it being zeroized, the third party would not be able to decrypt any other communications using the client blinding factor it was only used to decrypt this particular response message. In addition, even if a third part obtains access to both the client computer's static private key and the server computer's static private key, they could not decrypt the response message without obtaining the client blinding factor, which is zeroized shortly after the message is response message is received. Thus, perfect forward secrecy is maintained.

At 519, the client computer 540 can decrypt the encrypted server data using the second shared secret (e.g., using the second session key) to obtain the server blinding factor, the server certificate (corresponding to the static public key of the static key pair used for encryption), the server payload data 592, and the server blinded public key. The client computer 540 can perform the decryption using the Authenticated Encryption with Associated Data (AEAD) decryption process, for example.

At 519, the client computer 540 can verify the server using the server static public key, which is included in the server certificate of the response message, the server payload data 592, the server blinded public key, and the server static public key. The client computer 540 may verify the client signature using the Elliptic Curve Digital Signature Algorithm (ECDSA) for example. The client computer 540 may also validate the certificate chain of the server certificate included in the response message.

At 520, the client computer 540 and the server computer 580 may end the communication session or they may continue secure communications using the second session key.

The message flow of FIG. 5 enables the client computer 540 and the server computer 580 to establish secure communications using non-traceable messages, thereby ensuring the confidentiality of the communications and maintaining the privacy of the client computer 540, the server computer 580, and their users. In addition, the client computer 540 cannot repudiate the request message since it includes the client signature. The server computer 580 can also not repudiate the response message since it includes the server signature. Furthermore, the request and response messages maintain perfect forward secrecy since their encryption depends on the client blinding factor and the server blinding factor, which are zeroized immediately after they become unnecessary to the decryption process. In addition, the use of network and computing resources is reduced since this solution is achieved using only one request message and one response message.

Figure 6:
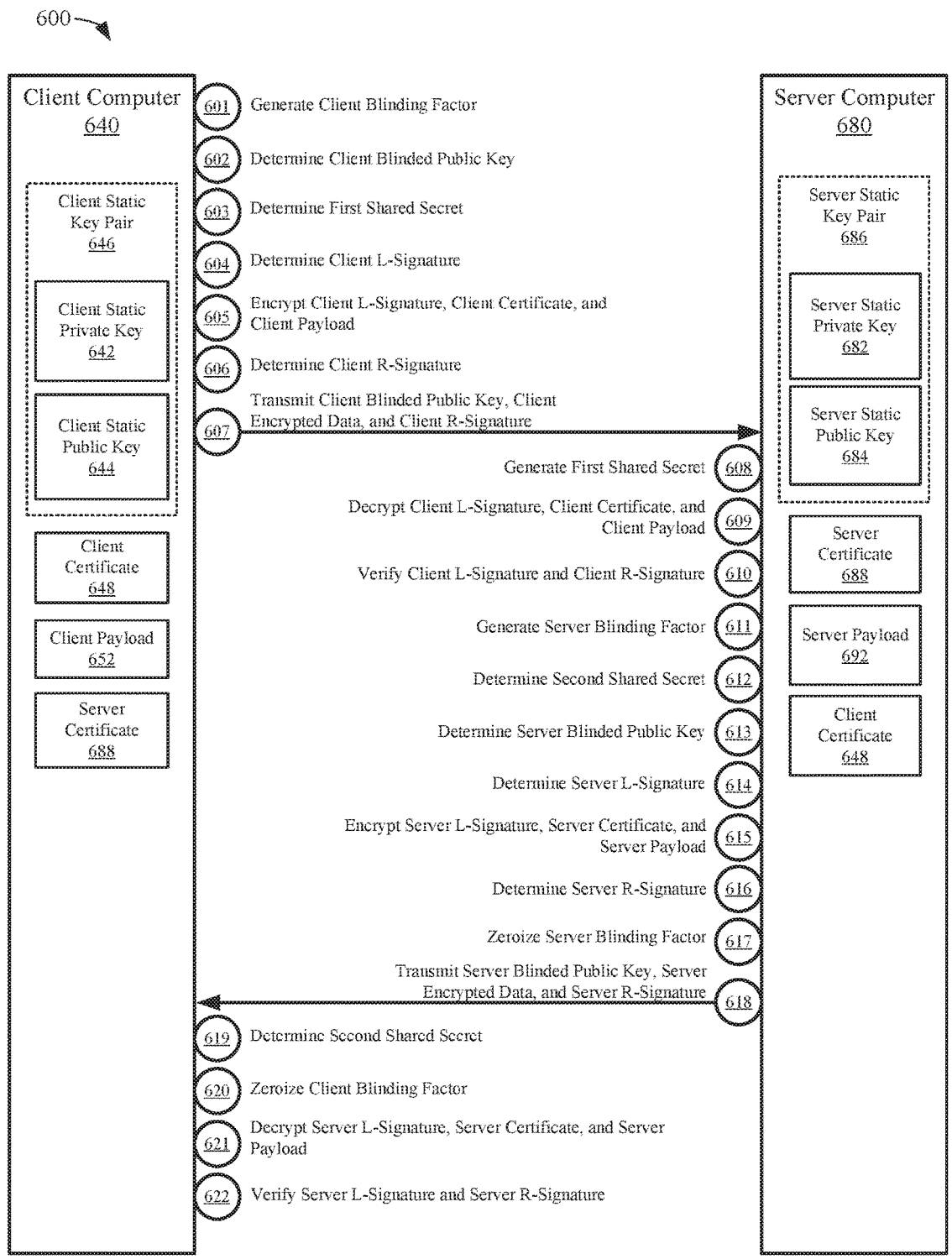
FIG. 6 shows a message flow diagram of a client computer and a server computer establishing secure and non-traceable communications using an encrypted signature portion and an unencrypted signature portion to provide non-repudiation, in accordance with some embodiments.

C. Secure Communications Providing Perfect Forward Secrecy and Non-Repudiation of the Client and Server Using Two-Part Private Signatures FIG. 6 shows a message flow diagram 600 of a client computer 640 and a server computer 680 establishing secure and non-traceable communications using an encrypted signature portion and an unencrypted signature portion to provide non-repudiation, in accordance with some embodiments. The encrypted signature portion can include identifying information while the unencrypted signature portion does not include identifying information. In addition, the unencrypted signature portion can be based on the encrypted data. As such, the signature can be based on the encrypted data while being "non-traceable."

This message flow includes a request message transmitted by the client computer 640 at 607 that cannot be repudiated by the client computer 640 and a response message transmitted by the server computer 680 at 618 that cannot be repudiated by the server computer 680. The request message at 607 and the response message at 618 are non-traceable since they include one-time-use blinded public keys instead of static public keys. Furthermore, request and response message maintain perfect forward secrecy. The generation and format of the request and response messages are described in further detail below.

In this message flow, the client computer 640 can initiate the establishment of secure communications. Prior to the message flow, the client computer 640 may store a client static key pair 646 including a client static private key 642 and a client static public key 644. The client computer may also store a client certificate 648 that is signed by a certificate authority and that includes the client static public key 644. The client computer 640 can also store the server certificate 688. In addition, the client computer 640 can store client payload data 652, which may be sensitive data.

At 601, the client computer 640 can generate a client blinding factor. The client blinding factor may be randomly generated.

At 602, the client computer 640 can determine a client blinded public key using the client blinding factor. The client blinding factor and the client blinded public key may form an elliptic curve key pair such that the client blinded public key may be used to decrypt data that is encrypted using the client blinding factor and the client blinded public key may be used to validate a signature generated by signing data with the client blinding factor.

At 603, the client computer 640 can determine a first shared secret using the client blinding factor and the server static public key 684, which can be included in the server certificate 688. The client computer 640 may determine a first session key using a key derivation function based on the first shared secret.

At 604, the client computer 640 can determine a client L-signature and a client L-signature random value using an L-signature algorithm. The L-signature algorithm may be an ECDSA signature algorithm or a Schnorr signature algorithm, for example.

At 605, the client computer 640 can encrypt the client L-signature, the client payload data 652, the client certificate 648, and the client blinded public key using the first shared secret (e.g., using the first session key) to determine client encrypted data. The client computer can perform the encryption using the Authenticated Encryption with Associated Data (AEAD) encryption process, for example. The client payload 652 may include sensitive client data and/or a request for certain data or information from the server computer 680. After encrypting the client payload 652, the client computer 640 can zeroize (e.g., completely delete to prevent any recovery) the first shared secret and the first session key.

At 606, the client computer 640 can determine a client R-signature using an R-signature algorithm based on the client static private key 642, the client L-signature random value, and the encrypted client data. As such, the L-signature is based on the unencrypted client payload data 652 while the R-signature is based on the encrypted client data. The client L-signature and the client R-signature together form the client signature. Both the L-signature and the R-signature are required to validate the request message. Together, the client L-signature and client R-signature provide non-repudiation of the request message from the client computer 640. In addition, the client R-signature is based on the client encrypted data, which includes the client blinded public key, which is only used in this communication session (e.g., the single request and single response message). As such, the client signature is only valid for this particular request message.

At 607, the client computer 640 can transmit a request message including the client blinded public key, the client encrypted data, and the client R-signature to the server computer 680. The client blinded public key and the client R-signature can be sent in the clear (e.g., unencrypted). As such, the client R-signature, which is based on the encrypted client data, is sent unencrypted while the client L-signature is included in the encrypted client data. The client L-signature may include the portions of the client signature that can be used to identify the client. Therefore, the client signature can be based on the encrypted client data while provided non-traceability since the R-signature portion is based on the encrypted data while the L-signature portion, which can be used to identify and track the client computer 640, is included in the encrypted client data.

The request message can also indicate that the client computer 640 requests to establish secure communications using a shared secret based on the client blinded public key. The request message may be transmitted over an unsecured network. The server computer 680 can receive the request message from the client computer 640. Since the client blinded public key is only used for this communication session (the client blinding factor is zeroized at 620), then it cannot be used to track the client computer 640. As such, the request message sent at 605 is non-traceable. In addition, the request message sent at 605 provides non-repudiation of the client computer 640 since the client encrypted data includes the client signature, which was generated using the client blinding factor. In addition, the request message maintains perfect forward secrecy since there is no data included in the request message that can be used to decrypt any data in other messages sent by the client computer 640, in the past or future. Perfect forward secrecy is maintained since the client blinded factor is not provided in the encrypted client data.

For instance, the client signature is used for authentication of the client computer 640 instead of using the blinding factor. However, the client signature does not include information that may be used to decrypt messages from the client computer 640 even if the client static private key 642 and the server static private key 682 are compromised.

At 608, the server computer 680 can determine the first shared secret using the server static private key 682 and the client blinded public key that was included in the request message. The first shared secret determined by the server computer at 606 using the server static private key 682 and the client blinded public key can be the same as the first shared secret determined by the client computer 640 at 603 using the client blinding factor and the server static public key 684. The server computer 680 may also may determine the same first session key determined by the client computer 640 using a key derivation function based on the first shared secret.

At 609, the server computer 680 can decrypt the client encrypted data using the first shared secret (e.g., using the first session key) to obtain the client L-signature, the client payload data 652, and the client certificate 648. The server computer may perform the decryption using the Authenticated Encryption with Associated Data (AEAD) decryption process, for example. After decrypting the client encrypted data, the server computer 680 can zeroize (e.g., completely delete to prevent any recovery) the first shared secret and the first session key.

At 610, the server computer 680 can verify the client signature, which includes both the client L-signature and the client R-signature, using the client static public key 644 (which is included in the client certificate 648), the client L-signature, the client R-signature, and the encrypted client data.

The server computer 680 may also validate the certificate chain of the client certificate 648. In addition, the server computer 680 may process the client payload 652 and generate or identify any appropriate data or information to include in the server payload 692 to be provided in response to the client computer's request.

At 611, the server computer 680 can generate a server blinding factor. The server blinding factor can be a randomly generated cryptographic nonce. The server computer 680 can use the server blinding factor to prevent third parties from tracking it as described herein. For instance, the server computer 680 can apply the server blinding factor to the server static public key 684 (e.g., using multiplication) to determine a server blinded public key. The server computer 680 may only this server blinding factor and this server blinded public key in this particular communication session with the client computer 640 (e.g., the request message and the response message) and may generate a different blinding factor for subsequent communications sessions. As such, the identity of the server computer 680 may not be tracked based on the server blinded public key.

At 612, the server computer 680 can determine a second shared secret using the server blinding factor, the server static private key 682, and the client blinded public key. In some embodiments, the server computer 680 may store multiple static key pairs and it can use a different static key pair for encrypting the response message. The server computer 680 may also determine a second session key using a key derivation function and the second shared secret.

At 613, the server computer 680 can determine a server L-signature and a server L-signature random value using an L-signature algorithm. The L-signature algorithm may be an ECDSA signature algorithm or a Schnorr signature algorithm, for example.

At 615, the server computer 680 can encrypt the server L-signature, the server payload data 692, the server certificate, and the server blinded public key using the second shared secret (e.g., using the second session key) to determine server encrypted data. The server computer 680 can perform the encryption using the Authenticated Encryption with Associated Data (AEAD) encryption process, for example. The server payload 692 may include sensitive server data and/or certain data or information in response to the request from the client computer 640. After encrypting, the client computer 680 can zeroize (e.g., completely delete to prevent any recovery) the first shared secret and the first session key.

At 616, the server computer 640 can determine a server R-signature using an R-signature algorithm based on the server static private key 682, the server L-signature random value, and the encrypted server data. As such, the server L-signature is based on the unencrypted server payload data 692 while the server R-signature is based on the encrypted server data. The server L-signature and the server R-signature together form the server signature. Both the server L-signature and the server R-signature are required to validate the response message from the server computer 680. Together, the server L-signature and server R-signature provide non-repudiation of the response message from the server computer 680. In addition, the server R-signature is based on the server encrypted data, which includes the server blinded public key, which is only used in this communication session (e.g., the single request and single response message). As such, the server signature is only valid for this particular request message.

At 617, the server computer 680 can zeroize the server blinding factor such that it cannot be recovered.

At 618, the server computer 680 can transmit a response message including the server R-signature, the server blinded public key, and the server encrypted data to the client computer 680. The response message may be sent over an unsecured network. The server blinded public key and the server R-signature can be sent in the clear (e.g., unencrypted). However, the server blinded public key is based on the server blinding factor which may only be used in this particular communication session. In addition, the server R-signature does not contain information identifying the server computer 680. Instead, any information identifying the server computer 680 is included in the server L-signature, which is included in the encrypted server data. Accordingly, the server computer 680 may not be tracked by a third party intercepting this message and other messages sent by the server computer 680. The client computer 640 can receive the response message.

At 619 the client computer 640 can determine the second shared secret using the client blinding factor and the server blinded public key, that was received in the response message. The second shared secret determined by the client computer 640 at 619 may be the same as the second shared secret determined by the server computer 680 at 612 using the client blinded public key, the server blinding factor, and the server static private key. The client computer 640 may also determine the same second session key (as also determined by the server computer 680) using a key derivation function and the second shared secret.

At 620, after determining the second shared secret and the second session key, the client computer 640 can zeroize the client blinding factor. That is, the client computer 640 can delete the client blinding factor such that it cannot be recovered later. Furthermore, even if the client blinding factor were compromised and obtained by a third party in the short period of time prior to it being zeroized, the third party would not be able to decrypt any other communications using the client blinding factor it was only used to decrypt this particular response message. In addition, even if a third part obtains access to both the client computer's static private key and the server computer's static private key, they could not decrypt the response message without obtaining the client blinding factor, which is zeroized shortly after the message is response message is received. Thus, perfect forward secrecy is maintained.

At 621, the client computer 540 can decrypt the encrypted server data using the second shared secret (e.g., using the second session key) to obtain the server L-signature, the server blinding factor, the server certificate (corresponding to the static public key of the static key pair used for encryption), and the server payload data 592. The client computer 640 can perform the decryption using the Authenticated Encryption with Associated Data (AEAD) decryption process, for example.

At 622, the client computer 640 can verify the server signature, which includes both the server L-signature and the server R-signature, using the server static public key (which is included in the client certificate), the server L-signature, the server R-signature, and the encrypted server data. Since the server signature, which is based on the encrypted server data, can be validated using the server's static public key, the server computer 680 cannot repudiate the response message.

Then, the client computer 640 and the server computer 680 may end the communication session or they may continue secure communications using the second session key.

The message flow of FIG. 6 enables the client computer 640 and the server computer 680 to establish secure communications using non-traceable messages, thereby ensuring the confidentiality of the communications and maintaining the privacy of the client computer 640, the server computer 680, and their users. In addition, the client computer 640 cannot repudiate the request message since it includes the client signature. The server computer 680 can also not repudiate the response message since it includes the server signature. In addition, the client signature and the server signature are based on their respective encrypted data, not just on the unencrypted data, which provides improved security. Furthermore, the client and server signatures do not include identifiable information sicne the L-signature portion is encrypted. As such, the combined L-signature and R-signature is private and anonymous. Furthermore, the request and response messages maintain perfect forward secrecy since their encryption depends on the client blinding factor and the server blinding factor, which are zeroized immediately after they become unnecessary to the decryption process. In addition, the use of network and computing resources is reduced since this solution is achieved using only one request message and one response message.

VI. Methods for Secure Communications

Methods for establishing secure communications are described below with reference to FIG. 7 and FIG. 8. The message flows described herein may incorporate these methods or a portion thereof.

A. Method for Requesting and Establishing Secure Communications

Figure 7:
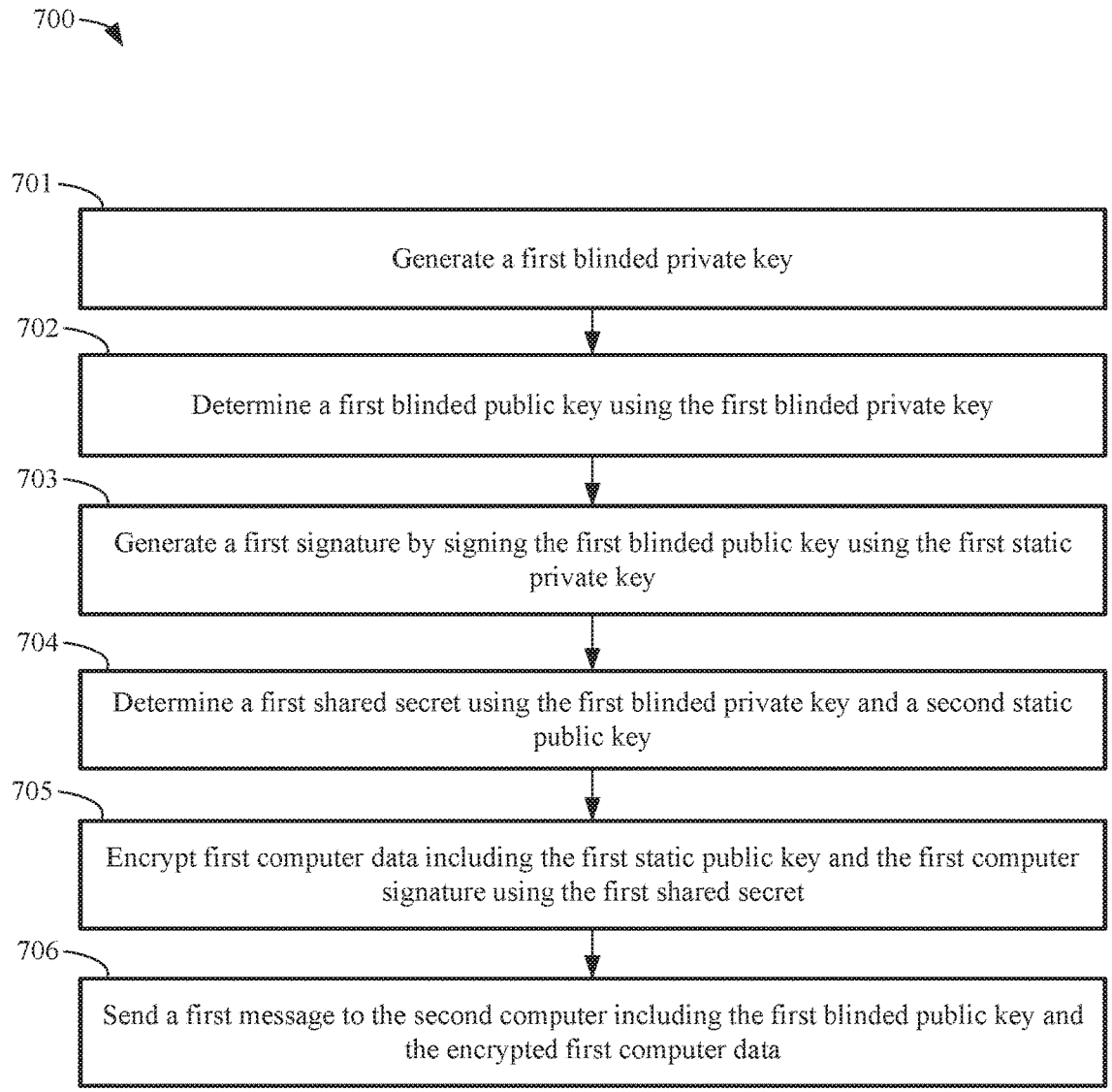
FIG. 7 shows a flowchart of a method for requesting and establishing secure communications, in accordance with some embodiments.

FIG. 7 shows a flowchart 700 of a method performed by a first computer for requesting and establishing secure communications, in accordance with some embodiments. The method can be performed by the client computer 440, client computer 540, or the client computer 640 discussed above, for example. Before beginning the method, the first computer can store a first static private key of the first computer, a first static public key of the first computer corresponding to the first static private key, and a second static public key of the second computer.

At 701, the first computer can generate a first blinding factor. The first blinding factor can be generated using a pseudo random number generator. The first blinding factor may be used as a private elliptic curve key.

At 702, the first computer can determine a first blinded public key using the first blinding factor. The first blinded public key and the first blinding factor can form an elliptic curve key pair.

At 703, the first computer can generate a first-computer signature by signing the first blinded public key using the first static private key. The first computer can also sign sensitive client data and an authentication public key of the second computer using the first static private key. The first computer can generate the signature using a digital signature algorithm (e.g., ECDSA).

At 704, the first computer can determine a first shared secret using the first blinding factor and a second static public key of the second computer. The first shared secret can be used to encrypt sensitive client data. The first computer can also determine a session key using the first shared secret.

At 705, the first computer can encrypt first computer data using the first shared secret. The first computer data can include the first static public key and the first-computer signature to obtain encrypted first-computer data.

At 706, the first computer can send a first message to the second computer including the first blinded public key and the encrypted first-computer data. The second computer generate the first shared secret and then verify the first computer signature.

Using the method of FIG. 7, the first computer can send a message to the second computer such that the second computer can validate the first computer's signature, thereby ensuring that the first computer generated the message.

B. Method for Responding to a Request to Establish Secure Communications

Figure 8:
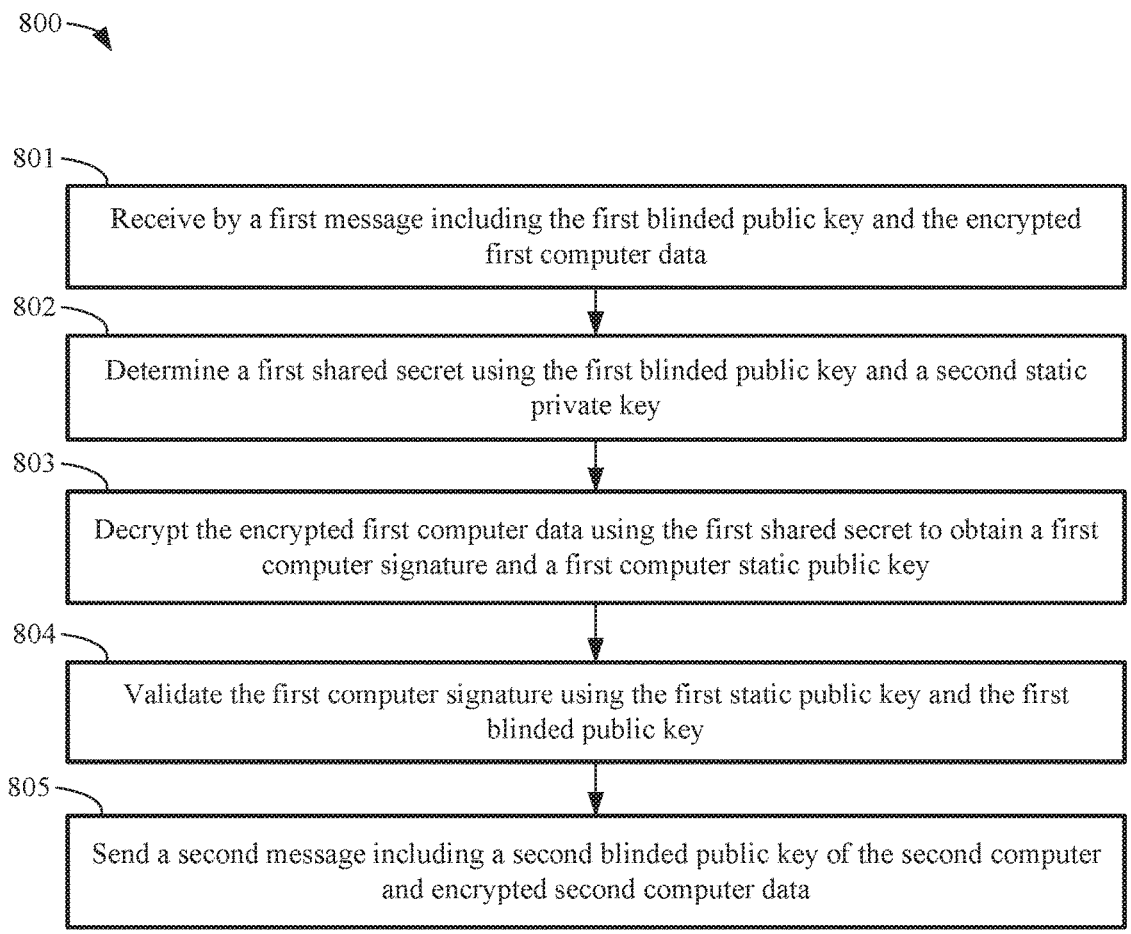
FIG. 8 shows a flowchart of a method for responding to a request to establish secure communications, in accordance with some embodiments.

FIG. 8 shows a flowchart 800 of a method for responding to a request to establish secure communications, in accordance with some embodiments. The method can be performed by the server computer 480, the server computer 580, or the server computer 680 discussed above, for example. Before beginning the method, the second computer can store a second static private key of the second computer, and a second static public key of the second computer corresponding to the second static private key.

At 801, the second computer can receive, from the first computer, a first message including a first blinded public key of the first computer and encrypted first-computer data of the first computer. The first message can be generated by the first computer using the method described above with respect to FIG. 7.

At 802, the second computer can determine a first shared secret using the first blinded public key and the second static private key. The second computer can determine the same first shared secret that was determined by the first computer.

At 803, the second computer can decrypt, using the first shared secret, the encrypted first-computer data to obtain first-computer data, the first-computer data including a first static public key and a first-computer signature of the first computer. The first-computer signature can be generated by the first computer signing the first blinded public key using a first static private key of the first computer. The first static private key can correspond to the first static public key.

At 804, the second computer can validate the first-computer signature using a first static public key of the first computer and the first blinded public key. The second computer can validate the first-computer signature using a digital signature algorithm (e.g., ECDSA).

At 805, the second computer can send a second message including a second blinded public key of the second computer and encrypted second computer data. The second computer data of the second message can be provided in response to the first message.

Using the method of FIG. 8, the second computer can authenticate the first computer by validating the first-computer signature.

V. Detailed Methods for Secure Communications

A first computer and a second computer can establish secure communications using non-traceable messages that provide non-repudiation and perfect forward secrecy as described herein. Such secure communications can be established by the first and second computer performing methods by implementing a set of instructions as described below with respect to FIGS. 9, 10, and 11. Table 1 below includes some definitions of terms and functions used in FIGS. 9, 10, and 11. A portion of all of the instructions, terms, and functions described with reference to FIGS. 9, 10, and 11, may be implemented in the message flows described herein where appropriate. The instructions, terms, and functions described with reference to FIGS. 9, 10, and 11 are exemplary, not exhaustive.

TABLE 1

| | |
|---|---|
| AEAD, AEAD-1 (sk, data, associated data) | Algorithm for Authenticated Encryption with Associated Data (AES session key SK, data to be encrypted or decrypted, associated data). The associated data can remain as is, but can be controlled for integrity. |
| Sign(sk, data), verify(vk, sig, data) | Algorithms for signing and verifying using a digital signature scheme (e.g., ECDSA). sk is the signing key. vk is the verification key. The signature scheme may also include hashing and verification of the hash. |
| PrivSign(sk, data) = [sign_L( ), sign_R(sk, random, data)] PrivVerify(vk, sig_L, Sig_R, data) | Algorithms for creating and validating "private" signatures. The signing algorithm consist of two different algorithms: sign_L( ) and sing_R( ). Sign_L( )outputs a random value and sig_L. sign_R( ) takes the signing key sk, the random value generated by sig_L and the data to sign and produces sig_R. Both sig_L and sig_R are needed to verify the signature. Knowing only Sig_R leaks no information about identify of the signer. Both ECDSA and Schnorr Signature, for example, can be used in this form and have these property. |
| enc_c | Encrypted data generated on client (IFD/Mobile) |
| enc_s | Encrypted data generated on server (ICC) |
| C_s | Certificate Chain authenticating the Server (ICC) |
| C_s_{n} | Certificate Chain authenticating the Server (ICC) - nth version |
| C_c | Certificate Chain authenticating the client (ICC) |
| d_bc | Client blinding factor |
| d_bs | Server Blinding factor |
| d_c, Q_c = [d_c]P | Client authentication public key, matched with the corresponding private key: d_c |
| d_ec, Q_ec = [d_ec]P | client ephemeral public key, matched with the ephemeral private key: d_ec |
| d_s, Q_s = [d_s]P | Server (ICC) authentication public key, matched with the corresponding private key: d_s |
| d_s_{n}, Q_s_{n} | Server (ICC) authentication public and private key, nth version. |
| ICC | Mobile phone, Integrated Circuit chip or server |
| ID_s | Server Identifier |
| IFD | Interface device or client |
| IV | Initialization vector (belongs to [0 . . . q-1]) |
| KDF | Key Derivation Function 800-56C based on AES C_MAC. Applied on concatenated input |
| PRNG | Pseudo random number generator |
| PubK (C) | Extract the public key from Cert C |
| q | Curve order |
| Q_bc | Blinded Client public key |
| Q_bs | Blinded server public key |
| SD_c | Client sensitive Data (payload) |
| SD_s | Server sensitive Data (payload) |
| seed | Counter or time, etc. verifiable at ICC or server and proving that blinding factor is fresh. |
| sID_s | Server (ICC) identifier for the session. Based on Q_bs x_coordinate |
| sID_c | Client (IFD or mobile device) identifier. Truncated value of Q_ec's x_coordinate |
| sk_1_c, sk_c, sk_1_s, sk_s, sk_2_c | AES Secure Messaging Session Keys |
| Z, Z_1, Z_2 | Intermediate Shared secrets (x-coordinate of EC-DH shared resulting point) |
| Zeroize | Destroy all input parameters - values set to all binary zeroes. |

A. Methods for Secure Communications Providing Perfect Forward Secrecy and Non-Repudiation of the Client FIG. 9 shows a table 900 of steps for performing a computer-implemented method to establish secure and non-traceable communications having perfect forward secrecy between a client computer and a sever computer such that the client computer cannot repudiate its messages, in accordance with some embodiments. The client computer can be an interface device (IFD), for example. The server computer can be an integrated circuit chip (ICC) or a mobile device, for example. Some of all of the steps in table 900 may be performed in the message flows described herein, such as the message flow of FIG. 4, for example. In addition, the steps in table 900 may be performed in a different order.

At 901, the client computer may store an nth version the server computer's authentication public key ("Q_s_{n}"). The client computer may have previously received this particular version of the server computer's public key from the server computer. The client computer may also store an nth version of the server computer's certificate ("C_s_{n}") for authenticating a certificate chain of the server computer. The client computer can also store client sensitive data ("SD_c"). The client sensitive data can be part of a payload sent in a request message to the server computer. The client computer can also store a server identifier ("ID_s") identifying the server computer. The client computer can also store a client certificate ("C_c") for authenticating a certificate chain of the client computer. The client computer can also store a client authentication private key ("d_c") that is matched with a corresponding client authentication public key ("Q_c"), forming an elliptic curve key pair. The client authentication public key ("Q_c") can be determined using a public key algorithm ("P") based on the client authentication private key (Q_c=[d_c] P). The client computer can also store a seed ("seed"). The seed can be a trust time value or a counter value that can be included in a message to indicate the freshness or timeliness of that message.

The server computer can store an nth version of a server authentication public ("Q_s_{n}") and a corresponding server authentication private key ("d_s_{n}") that form an elliptic curve key pair. The server computer can determine the server authentication public key using a public key algorithm ("P") based on the server authentication private key (Q_s_{n}=[d_s_{n}] P). The server computer can also store an nth version of a server certificate ("C_s_{n}") for authenticating a certificate chain of the server computer. The server computer can also store server sensitive data ("SD_s") that can be included in an encrypted payload to the client computer. The server computer can also store the next versions of the server authentication public key ("Q_s_{n+1}"), the server authentication private key ("d_s_{n+1}"), and the corresponding certificate ("C_s_{n+1}"). The next version of the server authentication public key ("Q_s_{n+1}") can be a different public key, but it can be signed using the server authentication private key ("d_s_{n}") corresponding to the server authentication public ("Q_s_{n}") in order to continue the certificate chain.

At 902, the client computer can generate a client blinding factor ("d_bc") using a pseudo-random number generator ("PRNG ( ) # [0 . . q−1]").

At 903, the client computer can determine a blinded client public key ("Q_bc") using a public key algorithm ("P") and the client blinding factor ("Q_bc=[d_bc]. P").

At 904, the client computer can determine a first intermediate shared secret ("Z_1"). The first intermediate shared secret can be based on an x-coordinate of an elliptic curve Diffie-Hellman shared resulting point based on the client blinding factor and the server authentication public (Z_1=[d_bc]. Q_s_{n}).

At 905, the client computer can determine a client identifier ("sID_c") for this session based on the elliptic curve x-coordinate of the blinded client public key (sID_c=x-coord (Q_bc)). The client identifier ("sID_c") can be a truncated value of the x-coordinate of the client's public encryption key.

At 906, the client computer can determine a first session key ("sk_1_c") using a key derivation function ("KDF") based on the first intermediate shared secret ("Z_1"), the server identifier ("ID_s"), and the client identifier ("sID_c") (sk_1_c=KDF (Z_1, ID_s, sID_c)).

At 907, the client computer can determine a client signature ("sig_c") by signing the stored seed, the client sensitive data ("SD_c"), the blinded client public key ("Q_bc"), and the nth version the server computer's authentication public key ("Q_s_{n}"), using a digital signature algorithm (e.g., ECDSA) with the client authentication private key ("d_c") (sig_c=sign(d_c, seed|SD_c|Q_bc|Q_s_{n})).

At 908, the client computer can generate encrypted client data ("enc_c") using the first session key ("sk_1_c"). The encryption may be performed using Authenticated Encryption with Associated Data (AEAD) (enc_c=AEAD (sk_1_c, seed|SD_c|C_c|sig_c|PAD_c, Q_bc). The data encrypted by the client computer can include the seed, the client sensitive data ("SD_c"), the client signature ("sig_c"), and client encryption padding ("PAD_c"). The client encryption padding ("PAD_c") can add an appropriate length to the encrypted data based on the encryption algorithm used. The encryption can also be based on associated data that remains as is (e.g., it is not encryption) but that is controlled for integrity. The associated data can include the blinded client public key ("Q_bc").

At 909, the client computer can zeroize the first intermediate shared secret ("Z_1") and the first session key ("sk_1_c").

At 910, the client computer can transmit a request message including the blinded client public key ("Q_bc") and the encrypted client data ("enc_c") to the server computer. As such, the request message is "non-traceable" because it neither the blinded client public key ("Q_bc") nor the encrypted client data ("enc_c") can be used to identify or track the client computer. For instance, the client authentication public key ("Q_c"), which may be used to identify the client computer (since its certificate chain can used to authenticate the client computer), is not sent in the clear and is encrypted instead. Only the blinded client public key ("Q_bc"), which is based on the randomly generated client blinding factor ("d_bc"), is sent in the clear.

At 911, the server computer can validate that the blinded client public key ("Q_bc") belongs to the elliptic curve domain.

At 912, the server computer can determine the same first intermediate shared secret ("Z_1") that was determined by the client computer. The server computer can determine the first intermediate shared secret ("Z_1") using the nth version of the server authentication private key ("d_s_{n}") and the blinded client public key ("Q_bc") (Z_1=[d_s_{n}]. Q_bc).

At 913, the server computer can determine the client identifier ("sID_c") based on the elliptic curve x-coordinate of the blinded client public key (sID_c=x-coord (Q_bc)). The client identifier ("sID_c") can be a truncated value of the x-coordinate of the client's public encryption key.

At 914, the server computer can determine the first session key ("sk_1_s") using a key derivation function ("KDF") based on the first intermediate shared secret ("Z_1"), the server identifier ("ID_s"), and the client identifier ("sID_c") (sk_1_c=KDF (Z_1, ID_s, sID_c)).

At 915, the server computer can decrypt the encrypted client data ("enc_c") using the first session key ("sk_1_c")

and a decryption algorithm (AEAD$^{-1}$) to determine the seed, the client sensitive data ("SD_c"), the client signature ("sig_c"), and client encryption padding ("PAD_c") (seed|SD_c|C_c|sig_c|PAD_c=AEAD-1 (sk_1_c, enc_c, Q_bc)).

At 916, the server computer can validate the seed (e.g., a counter or time) to prove that the client blinding factor is fresh (e.g., the amount of time since the client blinding factor was generated is not above a certain threshold).

At 917, the server computer can zeroize the first session key ("sk_1_c") and the first intermediate shared secret ("Z_1").

At 918, the server computer can determine the client authentication public key ("Q_c") by extracting it from the client certificate ("C_c") (Q_c=PubK(C_c)).

At 919, the server computer can validate the signature of the client certificate ("C_c") and verify that the client authentication public key ("Q_c") belongs to the elliptic curve domain.

At 920, the server computer can validate the client signature ("sig_c") with the client authentication public key ("Q_c") using a digital signature algorithm (e.g., ECDSA), and the seed, the client sensitive data ("SD_c"), the blinded client public key ("Q_bc"), and the nth version the server computer's authentication public key ("Q_s_{n}") (verify (Q_c, sig_c, seed|SD_c|Q_bc|Q_s_{n})). The client signature ("sig_c") provides non-repudiation of the client computer since it can be validated using the client authentication public key ("Q_c"), thereby ensuring that a computer with access to the client authentication private key ("d_c") (e.g., the client computer and, if security is maintained, only the client computer). In addition, the client signature ("sig_c") is generated by signing the client sensitive data ("SD_c"), the blinded client public key ("Q_bc"), and the nth version the server computer's authentication public key ("Q_s_{n}"). Therefore, the client signature ("sig_c") not only provides non-repudiation of the client computer, but also limits this signature to this particular session with this server computer. Accordingly, no other computer may claim to have been the recipient of this message.

At 921, the server computer can generate a server blinding factor ("d_bs") using a pseudo-random number generator (d_bs=PRNG ( ) # [0 . . . q−1]).

At 922, the server computer can determine a second intermediate shared secret ("Z") using the server blinding factor ("d_bs"), the next version of the server authentication private key ("d_s_{n+1}") and the blinded client public key ("Q_bc") (Z=[d_bs. d_s {n+1}] Q_bc).

At 923, the server computer can determine a blinded server public key ("Q_bs") using the server blinding factor ("d_bs") and the next version (n+1) of the server computer's authentication public key ("Q_s_{n+1}") (Q_bs=[d_bs]. Q_s_{n+1}).

At 924, the server computer can determine the server identifier for this communication session ("sID_s") using the blinded server public key ("Q_bs"). The server identifier ("sID_s") may be based on the elliptic curve x-coordinate of the blinded server public key ("Q_bs") (sID_s=x-coord (Q_bs)).

At 925, the server computer can determine a second session key ("sk_s|sk_c") using a key derivation function based on the second intermediate shared secret ("Z"), the server identifier ("sID_s") for this communication session, and the client identifier ("sID_c") for this session (sk_s|sk_c=KDF (Z, sID_s, sID_c)). The second session keys ("sk_s|sk_c") may be used for encrypting future messages sent between the client and the server in order to use different encryption keys in each direction (e.g., client to server and server to client).

At 926, the server computer can generate encrypted server data ("enc_s") using the second session key ("sk_s"). The encryption may be performed using Authenticated Encryption with Associated Data (AEAD) (enc_s=AEAD (sk_s, d_bs|C_s_{n+1}|SD_s|PAD_s, Q_bs)). The data encrypted by the server computer can include the server blinding factor ("d_bs"), the next version (n+1) of the server certificate ("C_s_{n+1}"), which is associated with the next version (n+1) of the server computer's authentication public key ("Q_s_{n+1}"), the server sensitive Data ("SD_s") (e.g., the server's payload in response to the client's request), and server encryption padding ("PAD_s"). The server encryption padding ("PAD_s") can add an appropriate length to the encrypted data based on the encryption algorithm used. The encryption can also be based on associated data that remains as is (e.g., it is not encryption) but that is controlled for integrity. The associated data can include the blinded server public key ("Q_bs").

At 927, the server computer can zeroize the second session key ("sk_s"), the second intermediate shared secret ("Z"), and the server blinding factor ("d_bs"). By zeroizing the first session key ("sk_1_c") and the first intermediate shared secret ("Z_1") at 917 and then zeroizing the second session key ("sk_s"), the second intermediate shared secret ("Z"), and the server blinding factor ("d_bs") at 928, the server computer maintains perfect forward secrecy. Perfect forward secrecy is maintained because any data that could potentially be used to crack the encryption of the response message (e.g., the sk_s, Z, d_bs, sk_1_c, and Z_1) has been deleted. For instance, the data remaining on the server computer, such as the static server authentication private key (d_s) and the static server authentication public key (Q_s), was not used in encrypting the encrypted server data (enc_s).

At 928, the server computer can transmit a response message including the blinded server public key ("Q_bs") and the encrypted server data ("enc_s") to the client computer. As such, the response message is "non-traceable" because it neither the blinded server public key ("Q_bs") nor the encrypted server data ("enc_s") can be used to identify or track the server computer. For instance, the static sever authentication public key ("Q_s"), which may be used to identify the server computer (since its certificate chain can used to authenticate the server computer), is not sent in the clear and is encrypted instead. Only the blinded server public key ("Q_bs"), which is based on the randomly generated server blinding factor ("d_bs"), is sent in the clear.

At 929, the client computer can validate that the blinded server public key ("Q_bs") belongs to the elliptic curve domain.

At 930, the client computer can determine the second intermediate shared secret ("Z") using the client blinding factor ("d_bc") and the blinded server public key ("Q_bs") (Z=[d_bc]. Q_bs).

At 931, the client computer can determine the server identifier for this communication session ("sID_s") using the blinded server public key ("Q_bs"). The server identifier ("sID_s") may be based on the elliptic curve x-coordinate of the blinded server public key ("Q_bs") (sID_s=x-coord (Q_bs)).

At 932, the client computer can determine the second session key ("sk_s|sk_c") using a key derivation function based on the second intermediate shared secret ("Z"), the server identifier ("sID_s") for this communication session, and the client identifier ("sID_c") for this session (sk_s|sk_c=KDF (Z, sID_s, sID_c)).

At 933, the client computer can zeroize the second intermediate shared secret ("Z") and the client blinding factor ("d_bc").

At 934, the client computer can decrypt the encrypted server data ("enc_s") using the first session key ("sk_s") and a decryption algorithm (AEAD$^{-1}$) to determine the server blinding factor ("d_bs"), the next version of the server certificate ("C_s_{n+1}"), the server sensitive Data ("SD_s"), and the server encryption padding ("PAD_s"). The blinded server public key ("Q_bs") may be used as additional data in the decryption algorithm.

At 935, the client computer can determine the next version of the server public key ("Q_s_{n+1}") by extracting it from the next version of the server certificate ("C_s_{n+1}") (Q_s_{n+1}=PubK(C_s_{n+1})).

At 936, the client computer can validate the signature of the server certificate ("C_s_{n+1}") and can verify that the server public key ("Q_s_{n+1}") belongs to the elliptic curve domain.

At 937, the client computer can validate the blinded server public key ("Q_bs") received in the response message by determining the blinded server public key ("Q_bs") using the server blinding factor ("d_bs") and the server public key ("Q_s_{n+1}"). Validation of the blinded server public key ("Q_bs") by itself may not provide non-repudiation. Non-repudiation can be provided using signatures as discussed above.

At 938, the client computer can zeroize the server blinding factor ("d_bs").

Using the method shown in table 900, the client computer and the server computer can establish secure communications using only two non-traceable messages, which can provide non-repudiation of the client computer and maintain perfect forward secrecy.

B. Method for Secure Communications Providing Perfect Forward Secrecy and Non-Repudiation of the Client and Server FIG. 10 shows a table 1000 of steps for performing a computer-implemented method to establish secure and non-traceable communications having perfect forward secrecy between a client computer and a sever computer such that the client computer and the server computer cannot repudiate their messages, in accordance with some embodiments. The client computer can be an interface device (IFD), for example. The server computer can be an integrated circuit chip (ICC) or a mobile device, for example. Some of all of the steps in table 1000 may be performed in the message flows described herein, such as the message flow of FIG. 5, for example. In addition, the steps in table 1000 may be performed in a different order.

At 1001, the client computer may store an nth version the server computer's authentication public key ("Q_s_{n}"). The client computer may have previously received this particular version of the server computer's public key from the server computer. The client computer may also store an nth version of the server computer's certificate ("C_s_{n}") for authenticating a certificate chain of the server computer. The client computer can also store client sensitive data ("SD_c"). The client sensitive data can be part of a payload sent in a request message to the server computer. The client computer can also store a server identifier ("ID_s") identifying the server computer. The client computer can also store a client certificate ("C_c") for authenticating a certificate chain of the client computer. The client computer can also store a client authentication private key ("d_c") that is matched with a corresponding client authentication public key ("Q_c"), forming an elliptic curve key pair. The client authentication public key ("Q_c") can be determined using a public key algorithm ("P") based on the client authentication private key (Q_c=[d_c] P). The client computer can also store a seed ("seed"). The seed can be a trust time value or a counter value that can be included in a message to indicate the freshness or timeliness of that message.

The server computer can store an nth version of a server authentication public ("Q_s_{n}") and a corresponding server authentication private key ("d_s_{n}") that form an elliptic curve key pair. The server computer can determine the server authentication public key using a public key algorithm ("P") based on the server authentication private key (Q_s_{n}=[d_s_{n}] P). The server computer can also store an nth version of a server certificate ("C_s_{n}") for authenticating a certificate chain of the server computer. The server computer can also store server sensitive data ("SD_s") that can be included in an encrypted payload to the client computer. The server computer can also store the next versions of the server authentication public key ("Q_s_{n+1}"), the server authentication private key ("d_s_{n+1}"), and the corresponding certificate ("C_s_{n+1}").

At 1002, the client computer can generate a client blinding factor ("d_bc") using a pseudo-random number generator ("PRNG ( ) # [0 . . . q-1]").

At 1003, the client computer can determine a blinded client public key ("Q_bc") using a public key algorithm ("P") and the client blinding factor ("Q_bc=[d_bc]. P").

At 1004, the client computer can determine a first intermediate shared secret ("Z_1"). The first intermediate shared secret can be based on an x-coordinate of an elliptic curve Diffie-Hellman shared resulting point based on the client blinding factor and the server authentication public (Z_1=[d_bc]. Q_s_{n}).

At 1005, the client computer can determine a client identifier ("sID_c") for this session based on the elliptic curve x-coordinate of the blinded client public key (sID_c=x-coord (Q_bc)). The client identifier ("sID_c") can be a truncated value of the x-coordinate of the client's public encryption key.

At 1006, the client computer can determine a first session key ("sk_1_c") using a key derivation function ("KDF") based on the first intermediate shared secret ("Z_1"), the server identifier ("ID_s"), and the client identifier ("sID_c") (sk_1_c=KDF (Z_1, ID_s, sID_c)).

At 1007, the client computer can determine a client signature ("sig_c") by signing the stored seed, the client sensitive data ("SD_c"), the blinded client public key ("Q_bc"), and the nth version the server computer's authentication public key ("Q_s_{n}"), using a digital signature algorithm (e.g., ECDSA) and with the client authentication private key ("d_c") (sig_c=sign(d_c, seed|SD_c|Q_bc|Q_s_{n})).

At 1008, the client computer can generate encrypted client data ("enc_c") using the first session key ("sk_1_c"). The encryption may be performed using Authenticated Encryption with Associated Data (AEAD) (enc_c=AEAD (sk_1_c, seed|SD_c|C_c|sig_c|PAD_c, Q_bc)). The data encrypted by the client computer can include the seed, the client sensitive data ("SD_c"), the client signature ("sig_c"), and client encryption padding ("PAD_c"). The client encryption padding ("PAD_c") can add an appropriate length to the encrypted data based on the encryption algorithm used. The encryption can also be based on associated data that remains as is (e.g., it is not encryption) but that is controlled for integrity. The associated data can include the blinded client public key ("Q_bc").

At 1009, the client computer can zeroize the first intermediate shared secret ("Z_1") and the first session key ("sk_1_c").

At 1010, the client computer can transmit a request message including the blinded client public key ("Q_bc") and the encrypted client data ("enc_c") to the server computer. As such, the request message is "non-traceable" because it neither the blinded client public key ("Q_bc") nor the encrypted client data ("enc_c") can be used to identify or track the client computer. For instance, the client authentication public key ("Q_c"), which may be used to identify the client computer since its certificate chain can used to authenticate it, is not sent in the clear and is encrypted instead. Only the blinded client public key ("Q_bc"), which is based on the randomly generated client blinding factor ("d_c"), is sent in the clear.

At 1011, the server computer can validate that the blinded client public key ("Q_bc") belongs to the elliptic curve domain.

At 1012, the server computer can determine the same first intermediate shared secret ("Z_1") that was determined by the client computer. The server computer can determine the first intermediate shared secret ("Z_1") using the nth version of the server authentication private key ("d_s_{n}") and the blinded client public key ("Q_bc") (Z_1=[d_s_{n}]. Q_bc).

At 1013, the server computer can determine the client identifier ("sID_c") based on the elliptic curve x-coordinate of the blinded client public key (sID_c=x-coord (Q_bc)). The client identifier ("sID_c") can be a truncated value of the x-coordinate of the client's public encryption key.

At 1014, the server computer can determine the first session key ("sk_1_s") using a key derivation function ("KDF") based on the first intermediate shared secret ("Z_1"), the server identifier ("ID_s"), and the client identifier ("sID_c") (sk_1_c=KDF (Z_1, ID_s, sID_c)).

At 1015, the server computer can decrypt the encrypted client data ("enc_c") using the first session key ("sk_1_c") and a decryption algorithm (AEAD$^{-1}$) to determine the seed, the client sensitive data ("SD_c"), the client signature ("sig_c"), and client encryption padding ("PAD_c") (seed|SD_c|C_c|sig_c|PAD_c=AEAD-1 (sk_1_c, enc_c, Q_bc)).

At 1016, the server computer can validate the seed (e.g., a counter or time) to prove that the client blinding factor is fresh (e.g., the amount of time since the client blinding factor was generated is not above a certain threshold).

At 1017, the server computer can zeroize the first session key ("sk_1_c") and the first intermediate shared secret ("Z_1").

At 1018, the server computer can determine the client authentication public key ("Q_c") by extracting it from the client certificate ("C_c") (Q_c=PubK(C_c)).

At 1019, the server computer can validate the signature of the client certificate ("C_c") and verify that the client authentication public key ("Q_c") belongs to the elliptic curve domain.

At 1020, the server computer can validate the client signature ("sig_c") with the client authentication public key ("Q_c") using a digital signature algorithm (e.g., ECDSA), and the seed, the client sensitive data ("SD_c"), the blinded client public key ("Q_bc"), and the nth version the server computer's authentication public key ("Q_s_{n}") (verify (Q_c, sig_c, seed|SD_c|Q_bc|Q_s_{n})). The client signature ("sig_c") provides non-repudiation of the client computer since it can be validated using the client authentication public key ("Q_c"), thereby ensuring that a computer with access to the client authentication private key ("d_c") (e.g., the client computer and, if security is maintained, only the client computer). In addition, the client signature ("sig_c") is generated by signing the client sensitive data ("SD_c"), the blinded client public key ("Q_bc"), and the nth version the server computer's authentication public key ("Q_s_{n}"). Therefore, the client signature ("sig_c") not only provides non-repudiation of the client computer, but also limits this signature to this particular session with this server computer. Accordingly, no other computer may claim to have been the recipient of this message.

At 1021, the server computer can generate a server blinding factor ("d_bs") using a pseudo-random number generator (d_bs=PRNG ( ) # [0 . . . q−1]).

At 1022, the server computer can determine a second intermediate shared secret ("Z") using the server blinding factor ("d_bs"), the next version of the server authentication private key ("d_s_{n+1}") and the blinded client public key ("Q_bc") (Z=[d_bs. d_s {n+1}] Q_bc).

At 1023, the server computer can determine a blinded server public key ("Q_bs") using the server blinding factor ("d_bs") and the next version (n+1) of the server computer's authentication public key ("Q_s_{n+1}") (Q_bs=[d_bs]. Q_s_{n+1}).

At 1024, the server computer can determine the server identifier for this communication session ("sID_s") using the blinded server public key ("Q_bs"). The server identifier ("sID_s") may be based on the elliptic curve x-coordinate of the blinded server public key ("Q_bs") (sID_s=x-coord (Q_bs)).

At 1025, the server computer can determine a second session key ("sk_s|sk_c") using a key derivation function based on the second intermediate shared secret ("Z"), the server identifier ("sID_s") for this communication session, and the client identifier ("sID_c") for this session (sk_s|sk_c=KDF (Z, sID_s, sID_c)).

At 1026, the server computer can determine a server signature ("sig_s") by signing the next version (n+1) of the server computer's certificate ("C_s_{n+1}"), server sensitive Data ("SD_s") (e.g., the payload), the blinded server public key ("Q_bs"), and the client authentication public key ("Q_c") using a digital signature algorithm (e.g., ECDSA) with the server authentication private key ("d_s") (sig_s=sign (d_s, C_s_{n+1}|SD_s|Q_bs|Q_c)).

At 1027, the server computer can generate encrypted server data ("enc_s") using the second session key ("sk_s"). The encryption may be performed using Authenticated Encryption with Associated Data (AEAD) (enc_s=AEAD (sk_s, d_bs|C_s_{n+1}|SD_s|PAD_s, Q_bs)). The data encrypted by the server computer can include the next version (n+1) of the server certificate ("C_s_{n+1}"), which is associated with the next version (n+1) of the server computer's authentication public key ("Q_s_{n+1}"), the server sensitive Data ("SD_s") (e.g., the server's payload in response to the client's request), the server signature ("sig_s"), and server encryption padding ("PAD_s"). The server encryption padding ("PAD_s") can add an appropriate length to the encrypted data based on the encryption algorithm used. The encryption can also be based on associated data that remains as is (e.g., it is not encryption) but that is controlled for integrity. The associated data can include the blinded server public key ("Q_bs").

At 1028, the server computer can zeroize the second session key ("sk_s"), the second intermediate shared secret ("Z"), and the server blinding factor ("d_bs"). By zeroizing the first session key ("sk_1_c") and the first intermediate shared secret ("Z_1") at 1017 and then zeroizing the second session key ("sk_s"), the second intermediate shared secret ("Z"), and the server blinding factor ("d_bs") at 1028, the server computer maintains perfect forward secrecy. Perfect forward secrecy is maintained because any data that could potentially be used to crack the encryption of the response message (e.g., the sk_s, Z, d_bs, sk_1_c, and Z_1) has been deleted. For instance, the data remaining on the server computer, such as the static server authentication private key (d_s) and the static server authentication public key (Q_s), was not used in encrypting the encrypted server data (enc_s).

At 1029, the server computer can transmit a response message including the blinded server public key ("Q_bs") and the encrypted server data ("enc_s") to the client computer. As such, the response message is "non-traceable" because it neither the blinded server public key ("Q_bs") nor the encrypted server data ("enc_s") can be used to identify or track the server computer. For instance, the static sever authentication public key ("Q_s"), which may be used to identify the server computer (since its certificate chain can used to authenticate the server computer), is not sent in the clear and is encrypted instead. Only the blinded server public key ("Q_bs"), which is based on the randomly generated server blinding factor ("d_bs"), is sent in the clear.

At 1030, the client computer can validate that the blinded server public key ("Q_bs") belongs to the elliptic curve domain.

At 1031, the client computer can determine the second intermediate shared secret ("Z") using the client blinding factor ("d_bc") and the blinded server public key ("Q_bs") (Z=[d_bc]. Q_bs).

At 1032, the client computer can determine the server identifier for this communication session ("sID_s") using the blinded server public key ("Q_bs"). The server identifier ("sID_s") may be based on the elliptic curve x-coordinate of the blinded server public key ("Q_bs") (sID_s=x-coord (Q_bs)).

At 1033, the client computer can determine the second session key ("sk_s|sk_c") using a key derivation function based on the second intermediate shared secret ("Z"), the server identifier ("sID_s") for this communication session, and the client identifier ("sID_c") for this session (sk_s|sk_c=KDF (Z, sID_s, sID_c)).

At 1034, the client computer can zeroize the second intermediate shared secret ("Z") and the client blinding factor ("d_bc").

At 1035, the client computer can decrypt the encrypted server data ("enc_s") using the first session key ("sk_s") and a decryption algorithm (AEAD$^{-1}$) to determine the next version of the server certificate ("C_s_{n+1}"), the server sensitive Data ("SD_s"), the server signature ("sig_s"), and the server encryption padding ("PAD_s"). The blinded server public key ("Q_bs") may be used as additional data in the decryption algorithm.

At 1036, the client computer can determine the next version of the server public key ("Q_s_{n+1}") by extracting it from the next version of the server certificate ("C_s_{n+1}") (Q_s_{n+1}=PubK(C_s_{n+1}).

At 1037, the client computer can validate the signature of the server certificate ("C_s_{n+1}") and can verify that the server public key ("Q_s_{n+1}") belongs to the elliptic curve domain.

At 1038, the client computer can validate the server signature ("sig_s") with the server authentication public key ("Q_s") using a digital signature algorithm (e.g., ECDSA), and the next version of the server certificate ("C_s_{n+1}"), the server sensitive data ("SD_s"), the blinded server public key ("Q_bs"), and the client public key ("Q_c") (verify(Q_s, sig_s, C_s_{n+1}|SD_s|Q_bs|Q_c)). The server signature ("sig_s") provides non-repudiation of the server computer since it can be validated using the server authentication public key ("Q_s"), thereby ensuring that a computer with access to the server authentication private key ("d_s") (e.g., the server computer and, if security is maintained, only the server computer). In addition, the server signature ("sig_s") is generated by signing the server sensitive data ("SD_s"), the blinded server public key ("Q_bs"), and the client authentication public key ("Q_c"). Therefore, the server signature ("sig_s") not only provides non-repudiation of the server computer, but also limits this signature to this particular session with this client computer. Accordingly, no other computer may claim to have been the recipient of this message.

Using the method shown in table 1000, the client computer and the server computer can establish secure communications using only two non-traceable messages, which can provide non-repudiation of the client computer and the server computer while maintaining perfect forward secrecy.

C. Method for Secure Communications Providing Perfect Forward Secrecy and Non-Repudiation of the Client and Server Using Two-Part Private Signatures FIG. 11 shows a table 1100 of steps for performing a computer-implemented method to establish secure and non-traceable communications using an encrypted signature portion and an unencrypted signature portion, in accordance with some embodiments. The client computer can be an interface device (IFD), for example. The server computer can be an integrated circuit chip (ICC) or a mobile device, for example. Some of all of the steps in table 1100 may be performed in the message flows described herein, such as the message flow of FIG. 6, for example. In addition, the steps in table 1100 may be performed in a different order.

At 1101, the client computer may store an nth version the server computer's authentication public key ("Q_s_{n}"). The client computer may have previously received this particular version of the server computer's public key from the server computer. The client computer may also store an nth version of the server computer's certificate ("C_s_{n}") for authenticating a certificate chain of the server computer. The client computer can also store client sensitive data ("SD_c"). The client sensitive data can be part of a payload sent in a request message to the server computer. The client computer can also store a server identifier ("ID_s") identifying the server computer. The client computer can also store a client certificate ("C_c") for authenticating a certificate chain of the client computer. The client computer can also store a client authentication private key ("d_c") that is matched with a corresponding client authentication public key ("Q_c"), forming an elliptic curve key pair. The client authentication public key ("Q_c") can be determined using a public key algorithm ("P") based on the client authentication private key (Q_c=[d_c] P). The client computer can also store a seed ("seed"). The seed can be a trust time value or a counter value that can be included in a message to indicate the freshness or timeliness of that message.

The server computer can store an nth version of a server authentication public ("Q_s_{n}") and a corresponding server authentication private key ("d_s_{n}") that form an elliptic curve key pair. The server computer can determine the server authentication public key using a public key algorithm ("P") based on the server authentication private key (Q_s_{n}=[d_s_{n}] P). The server computer can also store an nth version of a server certificate ("C_s_{n}") for authenticating a certificate chain of the server computer. The server computer can also store server sensitive data ("SD_s") that can be included in an encrypted payload to the client computer. The server computer can also store the next versions of the server authentication public key ("Q_s_{n+1}"), the server authentication private key ("d_s_{n+1}"), and the corresponding certificate ("C_s_{n+1}").

At 1102, the client computer can generate a client blinding factor ("d_bc") using a pseudo-random number generator ("PRNG ( ) # [0 . . . q−1]").

At 1103, the client computer can determine a blinded client public key ("Q_bc") using a public key algorithm ("P") and the client blinding factor ("Q_bc=[d_bc]. P").

At 1104, the client computer can determine a first intermediate shared secret ("Z_1"). The first intermediate shared secret can be based on an x-coordinate of an elliptic curve Diffie-Hellman shared resulting point based on the client blinding factor and the server authentication public (Z_1=[d_bc]. Q_s_{n}).

At 1105, the client computer can determine a client identifier ("sID_c") for this session based on the elliptic curve x-coordinate of the blinded client public key (sID_c=x-coord (Q_bc)). The client identifier ("sID_c") can be a truncated value of the x-coordinate of the client's public encryption key.

At 1106, the client computer can determine a first session key ("sk_1_c") using a key derivation function ("KDF") based on the first intermediate shared secret ("Z_1"), the server identifier ("ID_s"), and the client identifier ("sID_c") (sk_1_c=KDF (Z_1, ID_s, sID_c)).

The client computer can determine a client signature using an anonymous signing algorithm that includes an L-signature algorithm ("Sign_L( )") and an R-signature algorithm ("Sign_R( )"). At 1107, the client computer can determine an L-signature ("sigc_L") and a client random signature value ("rand_c") using the L-signature algorithm ("Sign_L( )").

At 1108, the client computer can generate encrypted client data ("enc_c") using the first session key ("sk_1_c"). The encryption may be performed using Authenticated Encryption with Associated Data (AEAD) (enc_c=AEAD (sk_1_c, seed|SD_c|C_c|sigc_L|PAD_c, Q_bc)). The data encrypted by the client computer can include the seed, the client sensitive data ("SD_c"), the client certificate ("C_c"), the client L-signature ("sigc_L"), and client encryption padding ("PAD_c"). The client encryption padding ("PAD_c") can add an appropriate length to the encrypted data based on the encryption algorithm used. The encryption can also be based on associated data that remains as is (e.g., it is not encryption) but that is controlled for integrity. The associated data can include the blinded client public key ("Q_bc").

At 1109, the client computer can determine a client R-signature ("sigc_R") using the R-signature algorithm ("Sign_R( )") and the client authentication private key ("d_c"), the client random signature value ("rand_c") (from the L-signature algorithm), and the encrypted client data ("enc_c"). As such, the client R-signature is based on the encrypted client data while the client L-signature is included in the encrypted client data.

At 1110, the client computer can zeroize the first intermediate shared secret ("Z_1") and the first session key ("sk_1_c").

At 1111, the client computer can transmit a request message including the blinded client public key ("Q_bc"), the client R-signature ("sigc_r"), and the encrypted client data ("enc_c") to the server computer. As such, the request message is "non-traceable" because it neither the blinded client public key ("Q_bc"), the client R-signature ("sigc_r"), nor the encrypted client data ("enc_c") can be used to identify or track the client computer. For instance, the client authentication public key ("Q_c") and the client L-signature ("sigc_L"), which may be used to identify the client computer, are not sent in the clear and are encrypted instead.

At 1112, the server computer can validate that the blinded client public key ("Q_bc") belongs to the elliptic curve domain.

At 1113, the server computer can determine the same first intermediate shared secret ("Z_1") that was determined by the client computer. The server computer can determine the first intermediate shared secret ("Z_1") using the nth version of the server authentication private key ("d_s_{n}") and the blinded client public key ("Q_bc") (Z_1=[d_s_{n}]. Q_bc).

At 1114, the server computer can determine the client identifier ("sID_c") based on the elliptic curve x-coordinate of the blinded client public key (sID_c=x-coord (Q_bc)). The client identifier ("sID_c") can be a truncated value of the x-coordinate of the client's public encryption key.

At 1115, the server computer can determine the first session key ("sk_1_c") using a key derivation function ("KDF") based on the first intermediate shared secret ("Z_1"), the server identifier ("ID_s"), and the client identifier ("sID_c") (sk_1_c=KDF (Z_1, ID_s, sID_c)).

At 1116, the server computer can decrypt the encrypted client data ("enc_c") using the first session key ("sk_1_c") and a decryption algorithm (AEAD$^{-1}$) to determine the seed, the client sensitive data ("SD_c"), the client signature ("sig_c"), and client encryption padding ("PAD_c") (seed|SD_c|C_c|sig_c|PAD_c=AEAD−1(sk_1_c, enc_c, Q_bc)).

At 1117, the server computer can validate the seed (e.g., a counter or time) to prove that the client blinding factor is fresh (e.g., the amount of time since the client blinding factor was generated is not above a certain threshold).

At 1118, the server computer can zeroize the first session key ("sk_1_c") and the first intermediate shared secret ("Z_1").

At 1119, the server computer can determine the client authentication public key ("Q_c") by extracting it from the client certificate ("C_c") (Q_c=PubK(C_c)).

At 1120, the server computer can validate the signature of the client certificate ("C_c") and verify that the client authentication public key ("Q_c") belongs to the elliptic curve domain.

At 1121, the server computer can validate the client signature, which includes both the client L-signature ("sigc_L") and the client R-signature ("sigc_R") with the client authentication public key ("Q_c") using a "private" digital signature algorithm based on the encrypted client data ("enc_c"). The "private" digital signature algorithm may be private in that it algorithm includes two different algorithms where one algorithm produces an R-signature based on the encrypted data that does not include identifying information and the other algorithm provides an L-signature including the identifying information, which can be encrypted. The client signature ("sigc_L" and "sigc_R" together) provides non-repudiation of the client computer since it can be validated using the client authentication public key ("Q_c"), thereby ensuring that a computer with access to the client authentication private key ("d_c") (e.g., the client computer and, if security is maintained, only the client computer). In addition, the client R-signature is generated by signing the encrypted client data ("enc_c") itself. In addition, the client R-signature does not include identifying information. Therefore, the client signature not only provides non-repudiation of the client computer, but it is also "non-traceable" while limiting this signature to this particular session with this server computer. Accordingly, no other computer may claim to have been the recipient of this message.

At 1122, the server computer can generate a server blinding factor ("d_bs") using a pseudo-random number generator (d_bs=PRNG ( ) # [0 . . . q−1]).

At 1123 the server computer can determine a second intermediate shared secret ("Z") using the server blinding factor ("d_bs"), the next version of the server authentication private key ("d_s_{n+1}") and the blinded client public key ("Q_bc") (Z=[d_bs. d_s {n+1}] Q_bc).

At 1124, the server computer can determine a blinded server public key ("Q_bs") using the server blinding factor ("d_bs") and the next version (n+1) of the server computer's authentication public key ("Q_s_{n+1}") (Q_bs=[d_bs]. Q_s_{n+1}).

At 1125, the server computer can determine the server identifier for this communication session ("sID_s") using the blinded server public key ("Q_bs"). The server identifier ("sID_s") may be based on the elliptic curve x-coordinate of the blinded server public key ("Q_bs") (sID_s=x-coord (Q_bs)).

At 1126, the server computer can determine a second session key ("sk_s|sk_c") using a key derivation function based on the second intermediate shared secret ("Z"), the server identifier ("sID_s") for this communication session, and the client identifier ("sID_c") for this session (sk_s|sk_c=KDF (Z, sID_s, sID_c)).

The server computer can determine a server signature using an anonymous signing algorithm that includes an L-signature algorithm ("Sign_L( )") and an R-signature algorithm ("Sign_R( )"). At 1127, the server computer can determine an L-signature ("sigc_L") and a server random signature value ("rand_s") using the L-signature algorithm ("Sign_L( )").

At 1128, the server computer can generate encrypted server data ("enc_s") using the second session key ("sk_s"). The encryption may be performed using Authenticated Encryption with Associated Data (AEAD) (enc_s=AEAD (sk_s, C_s_{n+1}|SD_s|sigs_L|PAD_s, Q_bs)). The data encrypted by the server computer can include the server certificate ("C_s_{n+1}"), the server sensitive data ("SD_s"), the server L-signature ("sigs_L"), and server encryption padding ("PAD_s"). The server encryption padding ("PAD_s") can add an appropriate length to the encrypted data based on the encryption algorithm used. The encryption can also be based on associated data that remains as is (e.g., it is not encryption) but that is controlled for integrity. The associated data can include the blinded server public key ("Q_bs").

At 1129, the server computer can determine a server R-signature ("sigs_R") using the R-signature algorithm ("Sign_R( )") and the server authentication private key ("d_s"), the server random signature value ("rand_s") (from the L-signature algorithm), and the encrypted server data ("enc_s"). As such, the server R-signature is based on the encrypted server data while the server L-signature is included in the encrypted server data.

At 1130, the server computer can zeroize the second session key ("sk_s"), the second intermediate shared secret ("Z"), and the server blinding factor ("d_bs"). By zeroizing the first session key ("sk_1_c") and the first intermediate shared secret ("Z_1") at 1017 and then zeroizing the second session key ("sk_s"), the second intermediate shared secret ("Z"), and the server blinding factor ("d_bs") at 1028, the server computer maintains perfect forward secrecy. Perfect forward secrecy is maintained because any data that could potentially be used to crack the encryption of the response message (e.g., the sk_s, Z, d_bs, sk_1_c, and Z_1) has been deleted. For instance, the data remaining on the server computer, such as the static server authentication private key (d_s) and the static server authentication public key (Q_s), was not used in encrypting the encrypted server data (enc_s).

At 1131, the server computer can transmit a response message including the blinded server public key ("Q_bs"), the server R-signature ("sigc_R"), and the encrypted server data ("enc_s") to the client computer. As such, the response message is "non-traceable" because it neither the blinded server public key ("Q_bs"), the server R-signature ("sigc_R"), nor the encrypted server data ("enc_s") can be used to identify or track the server computer. For instance, the static sever authentication public key ("Q_s"), which may be used to identify the server computer, is not sent in the clear and is encrypted instead At 1132, the client computer can validate that the blinded server public key ("Q_bs") belongs to the elliptic curve domain.

At 1133, the client computer can determine the second intermediate shared secret ("Z") using the client blinding factor ("d_bc") and the blinded server public key ("Q_bs") (Z=[d_bc]. Q_bs).

At 1134, the client computer can determine the server identifier for this communication session ("sID_s") using the blinded server public key ("Q_bs"). The server identifier ("sID_s") may be based on the elliptic curve x-coordinate of the blinded server public key ("Q_bs") (sID_s=x-coord (Q_bs)).

At 1135, the client computer can determine the second session key ("sk_s|sk_c") using a key derivation function based on the second intermediate shared secret ("Z"), the server identifier ("sID_s") for this communication session, and the client identifier ("sID_c") for this session (sk_s|sk_c=KDF (Z, sID_s, sID_c)).

At 1136, the client computer can zeroize the second intermediate shared secret ("Z") and the client blinding factor ("d_bc").

At 1137, the client computer can decrypt the encrypted server data ("enc_s") using the first session key ("sk_s") and a decryption algorithm (AEAD$^{-1}$) to determine the next version of the server certificate ("C_s_{n+1}"), the server sensitive Data ("SD_s"), the server L-signature ("sigs_L"), and the server encryption padding ("PAD_s"). The blinded server public key ("Q_bs") may be used as additional data in the decryption algorithm.

At 1138, the client computer can determine the next version of the server public key ("Q_s_{n+1}") by extracting it from the next version of the server certificate ("C_s_{n+1}") (Q_s_{n+1}=PubK(C_s_{n+1}).

At 1139, the client computer can validate the signature of the server certificate ("C_s_{n+1}") and can verify that the server public key ("Q_s_{n+1}") belongs to the elliptic curve domain.

At 1140, the client computer can validate the server signature, which includes both the server L-signature ("sigs_L") and the server R-signature ("sigs_R") with the server authentication public key ("Q_s") using a "private" digital signature algorithm based on the encrypted server data ("enc_s"). The "private" digital signature algorithm may be private in that it algorithm includes two different algorithms where one algorithm produces an R-signature based on the encrypted data that does not include identifying information and the other algorithm provides an L-signature including the identifying information, which can be encrypted. The server signature ("sigc_L" and "sigc_R" together) provides non-repudiation of the server computer since it can be validated using the server authentication public key ("Q_s"), thereby ensuring that a computer with access to the server authentication private key ("d_s") (e.g., the server computer and, if security is maintained, only the servr computer). In addition, the server R-signature is generated by signing the encrypted server data ("enc_s") itself. In addition, the server R-signature does not include identifying information of the server computer. Therefore, the server signature not only provides non-repudiation of the server computer, but it is also "non-traceable" while limiting this signature to this particular session with this client computer. Accordingly, no other computer may claim to have been the recipient of this message.

Using the method shown in table 1100, the client computer and the server computer can establish secure communications using only two non-traceable messages, which can provide non-repudiation of the client computer and the server computer while maintaining perfect forward secrecy.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. The use of the terms "first," "second," "third," "fourth," "fifth," "sixth," "seventh," "eighth," "ninth," "tenth," and so forth, does not necessary indicate an ordering or a numbering of different elements and may simply be used for naming purposes to clarify distinct elements. The use of "client" computer and "server" computer does not necessary indicate the intended use of the computers, but may simply be used for naming purposes.

All patents, patent applications, publications, and descriptions mentioned herein are incorporated by reference in their entirety for all purposes. None is admitted to be prior art.

What is claimed is:

1. A computer-implemented method for performing communications between a first computer and a second computer, the method comprising:
   storing, by the first computer, a first static private key of the first computer, a first static public key of the first computer corresponding to the first static private key, and a second static public key of the second computer;
   generating, by the first computer, a first blinding factor;
   determining, by the first computer, a first blinded public key using the first blinding factor;
   determining, by the first computer, a first shared secret using the first blinding factor and the second static public key;
   generating, by the first computer using a left signature algorithm, a first-computer left signature and a first-computer random signature-value;
   encrypting, by the first computer using the first shared secret, first-computer data including the first static public key and the first-computer left signature to obtain encrypted first-computer data;
   generating, by the first computer, a first-computer right-signature by signing the encrypted first-computer data and the first-computer random signature-value with the first static private key using a right signature algorithm; and
   sending, by the first computer to the second computer, a first message including the first blinded public key, the first-computer right-signature, and the encrypted first-computer data.

2. The method of claim 1, wherein the first blinding factor is generated using a pseudo-random number generator, wherein the first blinded public key is determined from the first blinding factor using an elliptic curve public key algorithm, and wherein the first-computer data further includes a first-computer certificate, the first-computer certificate including the first static public key.

3. The method of claim 1, further comprising:
   receiving, by the first computer, a second message from the second computer including a second blinded public key of the second computer and encrypted second-computer data;
   determining, by the first computer, a second shared secret using the first blinding factor and the second blinded public key; and
   decrypting, by the first computer, the encrypted second-computer data using the second shared secret.

4. The method of claim 3, wherein the second computer determines the first shared secret using the first blinded public key and a second static private key of the second computer corresponding to the second static public key, decrypts the encrypted first-computer data using the first shared secret, validates the first-computer left signature and the first-computer right-signature using the first static public key, and sends a second message to the first computer including a second blinded public key of the second computer and encrypted second-computer data.

5. The method of claim 3, wherein the encrypted second-computer data includes a second-computer signature, the method further comprising:
   validating, by the first computer, a second-computer signature of the second computer using the second static public key.

6. The method of claim 3, further comprising validating the second blinded public key using the second static public key and a second computer blinding factor, wherein the encrypted second-computer data includes the second computer blinding factor.

7. A computer-implemented method for performing communications between a first computer and second computer, the method comprising:
   storing, by the second computer, a second static private key of the second computer, and a second static public key of the second computer corresponding to the second static private key;
   receiving, from the first computer by the second computer, a first message including a first blinded public key of the first computer, a first-computer right-signature, and encrypted first-computer data, wherein the first-computer right-signature is generated by the first computer by signing the encrypted first-computer data and a first-computer random signature-value with a first static private key of the first computer using a right signature algorithm, wherein the first-computer random signature-value is generated by the first computer using a left signature algorithm;
   determining, by the second computer, a first shared secret using the first blinded public key and the second static private key, wherein the first computer generates a first blinding factor, determines the first blinded public key using the first blinding factor, determines the first shared secret using the first blinding factor and the second static public key, and encrypts first-computer data using the first shared secret;
   decrypting, by the second computer using the first shared secret, the encrypted first-computer data to obtain the first-computer data, the first-computer data including a first static public key of the first computer corresponding to the first static private key and a first-computer left-signature, wherein the first-computer left-signature is generated by the first computer using the left signature algorithm; and
   validating, by the second computer, the first-computer left-signature and the first-computer right-signature using the first static public key and the encrypted first-computer data.

8. The method of claim 7, further comprising:
   generating, by the second computer, a second blinding factor;
   determining, by the second computer, a second blinded public key of the second computer using the second blinding factor and the second static public key;
   determining, by the second computer, a second shared secret using the first blinded public key, the second blinding factor, and the second static private key;
   generating, by the second computer using a left signature algorithm, a second computer left-signature and a second computer random signature-value;
   encrypting, by the second computer using the second shared secret, second computer data including the second static public key and the second computer left-signature to obtain encrypted second-computer data;
   generating, by the second computer, a second computer right-signature by signing the encrypted second-computer data and the first-computer random signature-value with the first static private key using a right signature algorithm; and
   sending, by the second computer to the first computer, a second message including the second blinded public key, the second computer right-signature, and the encrypted second computer data.

9. The method of claim 8, wherein the first computer determines the second shared secret using the second blinded public key, decrypts the encrypted second computer data using the second shared secret to obtain the second computer left-signature, and verifies the second computer right-signature and the second computer left-signature using the second static public key.

10. A first computer comprising:
a memory that stores computer-executable instructions; and one or more hardware processors configured to access the memory and execute the computer-executable instructions to:
store a first static private key of the first computer, a first static public key of the first computer corresponding to the first static private key, and a second static public key of a second computer;
generate a first blinding factor;
determine a first blinded public key using the first blinding factor;
determine a first shared secret using the first blinding factor and the second static public key;
generate, using a left signature algorithm, a first-computer left signature and a first-computer random signature-value;
encrypt, using the first shared secret, first-computer data including the first static public key and the first-computer left signature to obtain encrypted first-computer data;
generate a first-computer right-signature by signing the encrypted first-computer data and the first-computer random signature-value with the first static private key using a right signature algorithm; and
send, to the second computer, a first message including the first blinded public key, the first-computer right-signature, and the encrypted first-computer data.

11. The first computer of claim 10, wherein the first blinding factor is generated using a pseudo-random number generator, wherein the first blinded public key is determined from the first blinding factor using an elliptic curve public key algorithm, and wherein the first-computer data further includes a first-computer certificate, the first-computer certificate including the first static public key.

12. The first computer of claim 10, wherein the one or more hardware processors are further configured to access the memory and execute the computer-executable instructions to:
receive a second message from the second computer including a second blinded public key of the second computer and encrypted second-computer data;
determine a second shared secret using the first blinding factor and the second blinded public key; and
decrypt the encrypted second-computer data using the second shared secret.

13. The first computer of claim 12, wherein the second computer determines the first shared secret using the first blinded public key and a second static private key of the second computer corresponding to the second static public key, decrypts the encrypted first-computer data using the first shared secret, validates the first-computer left signature and the first-computer right-signature using the first static public key, and sends a second message to the first computer including a second blinded public key of the second computer and encrypted second-computer data, and
wherein the one or more hardware processors are further configured to access the memory and execute the computer-executable instructions to:
receive the second message from the second computer.

14. The first computer of claim 12, wherein the encrypted second-computer data includes a second-computer signature, and wherein the one or more hardware processors are further configured to access the memory and execute the computer-executable instructions to:
validate a second-computer signature of the second computer using the second static public key.

15. The first computer of claim 12, wherein the one or more hardware processors are further configured to access the memory and execute the computer-executable instructions to:
validate the second blinded public key using the second static public key and a second computer blinding factor, wherein the encrypted second-computer data includes the second computer blinding factor.

16. A second computer comprising:
a memory that stores computer-executable instructions; and
one or more hardware processors configured to access the memory and execute the computer-executable instructions to:
store a second static private key of the second computer and a second static public key of the second computer corresponding to the second static private key;
receive, from a first computer, a first message including a first blinded public key of the first computer, a first-computer right-signature, and encrypted first-computer data, wherein the first-computer right-signature is generated by the first computer by signing the encrypted first-computer data and a first-computer random signature-value with a first static private key of the first computer using a right signature algorithm, wherein the first-computer random signature-value is generated by the first computer using a left signature algorithm;
determine a first shared secret using the first blinded public key and the second static private key, wherein the first computer generates a first blinding factor, determines the first blinded public key using the first blinding factor, determines the first shared secret using the first blinding factor and the second static public key, and encrypts first-computer data using the first shared secret;
decrypt, using the first shared secret, the encrypted first-computer data to obtain the first-computer data, the first-computer data including a first static public key of the first computer corresponding to the first static private key and a first-computer left-signature, wherein the first-computer left-signature is generated by the first computer using the left signature algorithm; and
validate the first-computer left-signature and the first-computer right-signature using the first static public key and the encrypted first-computer data.

17. The second computer of claim 16, wherein the one or more hardware processors are further configured to access the memory and execute the computer-executable instructions to:
generate a second blinding factor;
determine a second blinded public key of the second computer using the second blinding factor and the second static public key;
determine a second shared secret using the first blinded public key, the second blinding factor, and the second static private key;
generate, using a left signature algorithm, a second computer left-signature and a second computer random signature-value;

encrypt, using the second shared secret, second computer data including the second static public key and the second computer left-signature to obtain encrypted second-computer data;

generate a second computer right-signature by signing the encrypted second-computer data and the first-computer random signature-value with the first static private key using a right signature algorithm; and send, to the first computer, a second message including the second blinded public key, the second computer right-signature, and the encrypted second computer data.

18. The second computer of claim 17, wherein the first computer determines the second shared secret using the second blinded public key, decrypts the encrypted second computer data using the second shared secret to obtain the second computer left-signature, and verifies the second computer right-signature and the second computer left-signature using the second static public key.

* * * * *

UNITED STATES PATENT AND TRADEMARK OFFICE
CERTIFICATE OF CORRECTION

PATENT NO. : 10,313,133 B2  
APPLICATION NO. : 15/629689  
DATED : June 4, 2019  
INVENTOR(S) : Eric Le Saint and Payman Mohassel Page 1 of 1

It is certified that error appears in the above-identified patent and that said Letters Patent is hereby corrected as shown below:

In the Claims

Column 47, Line 57 Claim 4 delete "and sends a second message" and insert -- and sends the second message --

Column 47, Line 58 Claim 4 delete "including a second blinded" and insert -- including the second blinded --

Column 47, Line 59 Claim 4 delete "and encrypted second-computer" and insert -- and the encrypted second-computer --

Column 47, Line 63 Claim 5 delete "a second-computer" and insert -- the second-computer --

Column 49, Line 61 Claim 13 delete "and sends a second message" and insert -- and sends the second message --

Column 49, Line 62 Claim 13 delete "including a second blinded" and insert -- including the second blinded --

Column 49, Line 63 Claim 13 delete "and encrypted second-computer" and insert -- and the encrypted second-computer --

Column 50, Line 6 Claim 14 delete "validate a second-computer" and insert -- validate the second-computer --

Signed and Sealed this  
Fifteenth Day of October, 2019

Andrei Iancu  
*Director of the United States Patent and Trademark Office*